United States Patent
Fujimoto

(10) Patent No.: US 11,747,136 B2
(45) Date of Patent: Sep. 5, 2023

(54) OPTICAL DISPLACEMENT MEASUREMENT SYSTEM, PROCESSING DEVICE, AND OPTICAL DISPLACEMENT METER

(71) Applicant: Keyence Corporation, Osaka (JP)

(72) Inventor: Takashi Fujimoto, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 17 days.

(21) Appl. No.: 17/585,634

(22) Filed: Jan. 27, 2022

(65) Prior Publication Data

US 2022/0290978 A1 Sep. 15, 2022

(30) Foreign Application Priority Data

Mar. 9, 2021 (JP) ................. 2021-037798

(51) Int. Cl.
G01B 11/25 (2006.01)

(52) U.S. Cl.
CPC ...... *G01B 11/2518* (2013.01); *G01B 11/2513* (2013.01)

(58) Field of Classification Search
CPC . G01B 11/2513; G01B 11/2518; G01B 11/10; G01B 11/2522
USPC ................................. 356/600–640
See application file for complete search history.

(56) References Cited

U.S. PATENT DOCUMENTS

| | | | |
|---|---|---|---|
| 7,489,410 B2 | 2/2009 | Nishio | |
| 7,667,857 B2 | 2/2010 | Nishio | |
| 7,751,065 B2 | 7/2010 | Nishio et al. | |
| 8,675,209 B2 | 3/2014 | Usami | |
| 9,866,747 B2 | 1/2018 | Satoyoshi | |
| 10,746,529 B1 | 8/2020 | Miyagawa | |
| 10,746,536 B2 | 8/2020 | Tsuchida | |
| 10,767,976 B2 | 9/2020 | Tsuchida | |
| 10,921,114 B2 | 2/2021 | Fuyuno et al. | |
| 11,073,376 B2 | 7/2021 | Fuyuno | |

(Continued)

FOREIGN PATENT DOCUMENTS

| | | |
|---|---|---|
| JP | 202027053 A | 2/2020 |
| JP | 202027054 A | 2/2020 |

OTHER PUBLICATIONS

U.S. Appl. No. 17/749,174, filed May 20, 2022 (151 pages).

*Primary Examiner* — Tri T Ton
(74) *Attorney, Agent, or Firm* — Kilyk & Bowersox, P.L.L.C.

(57) ABSTRACT

A shape generation unit generates three-dimensional data of an adjustment workpiece by synthesizing a plurality of pieces of profile data generated corresponding to each position in a Y1 direction due to relative movement of the adjustment workpiece having a spherical surface in a movement direction A of an imaging head corresponding to the Y1 direction. A sphere information calculation unit calculates a parameter of the spherical surface defined by a plurality of points included in the three-dimensional data. A distortion amount calculation unit calculates a distortion amount of the spherical surface based on the parameter. A correction value calculation unit calculates at least one of a first rotation angle correction value about an X2 axis and a second rotation angle correction value about a Z2 axis in the plurality of pieces of profile data constituting the three-dimensional data so as to reduce the distortion amount.

12 Claims, 19 Drawing Sheets

(56) References Cited

U.S. PATENT DOCUMENTS

| | | |
|---|---|---|
| 11,112,236 B2 | 9/2021 | Homma |
| 2005/0093713 A1* | 5/2005 | Orme .................... G03B 35/14 340/815.4 |
| 2020/0363191 A1 | 11/2020 | Tsuchida |

* cited by examiner

LIGHT RECEIVING AMOUNT DISTRIBUTION IN PIXEL ARRAY AT POSITION $x_1$

LIGHT RECEIVING AMOUNT DISTRIBUTION IN PIXEL ARRAY AT POSITION $x_2$

LIGHT RECEIVING AMOUNT DISTRIBUTION IN PIXEL ARRAY AT POSITION $x_3$

FIG. 11

$$
\begin{array}{cccccc}
\vdots & \vdots & \vdots & & \vdots & \ddots \\
(x_i, y_1, z_{i1}, I_{i1}) & (x_i, y_2, z_{i2}, I_{i2}) & (x_i, y_3, z_{i3}, I_{i3}) & \cdots & (x_i, y_j, z_{ij}, I_{ij}) & \cdots \\
\vdots & \vdots & \vdots & \ddots & \vdots & \\
(x_3, y_1, z_{31}, I_{31}) & (x_3, y_2, z_{32}, I_{32}) & (x_3, y_3, z_{33}, I_{33}) & \cdots & (x_3, y_j, z_{3j}, I_{3j}) & \cdots \\
(x_2, y_1, z_{21}, I_{21}) & (x_2, y_2, z_{22}, I_{22}) & (x_2, y_3, z_{23}, I_{23}) & \cdots & (x_2, y_j, z_{2j}, I_{2j}) & \cdots \\
(x_1, y_1, z_{11}, I_{11}) & (x_1, y_2, z_{12}, I_{12}) & (x_1, y_3, z_{13}, I_{13}) & \cdots & (x_1, y_j, z_{1j}, I_{1j}) & \cdots \\
\end{array}
$$

FIG. 12

THREE-DIMENSIONAL DATA

| | $x_1$ | $x_2$ | $x_3$ | $\cdots$ | $x_i$ | $\cdots$ |
|---|---|---|---|---|---|---|
| $y_1$ | $z_{11}$ | $z_{21}$ | $z_{31}$ | $\cdots$ | $z_{i1}$ | $\cdots$ |
| $y_2$ | $z_{12}$ | $z_{22}$ | $z_{32}$ | $\cdots$ | $z_{i2}$ | $\cdots$ |
| $y_2$ | $z_{13}$ | $z_{23}$ | $z_{33}$ | $\cdots$ | $z_{i3}$ | $\cdots$ |
| $\vdots$ | $\vdots$ | $\vdots$ | $\vdots$ | $\ddots$ | $\vdots$ | |
| $y_j$ | $z_{1j}$ | $z_{2j}$ | $z_{3j}$ | $\cdots$ | $z_{ij}$ | $\cdots$ |
| $\vdots$ | $\vdots$ | $\vdots$ | $\vdots$ | | $\vdots$ | $\ddots$ |

LUMINANCE IMAGE DATA

|   | $x_1$ | $x_2$ | $x_3$ | ... | $x_i$ | ... |
|---|---|---|---|---|---|---|
| $y_1$ | $I_{11}$ | $I_{21}$ | $I_{31}$ | ... | $I_{i1}$ | ... |
| $y_2$ | $I_{12}$ | $I_{22}$ | $I_{32}$ | ... | $I_{i2}$ | ... |
| $y_2$ | $I_{13}$ | $I_{23}$ | $I_{33}$ | ... | $I_{i3}$ | ... |
| ⋮ | ⋮ | ⋮ | ⋮ | ⋱ | ⋮ | |
| $y_j$ | $I_{1j}$ | $I_{2j}$ | $I_{3j}$ | ... | $I_{ij}$ | ... |
| ⋮ | ⋮ | ⋮ | ⋮ | | ⋮ | ⋱ |

FIG. 15
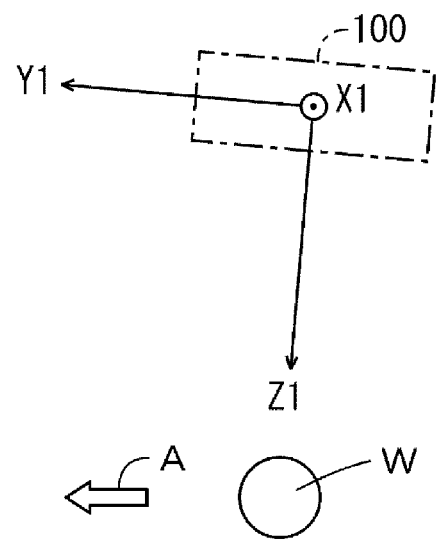
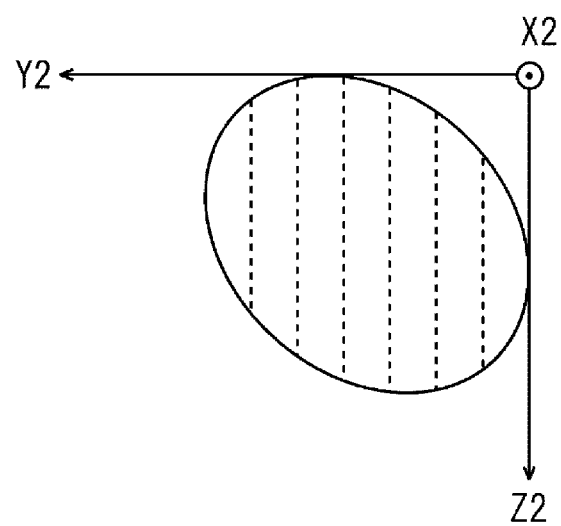

FIG. 16
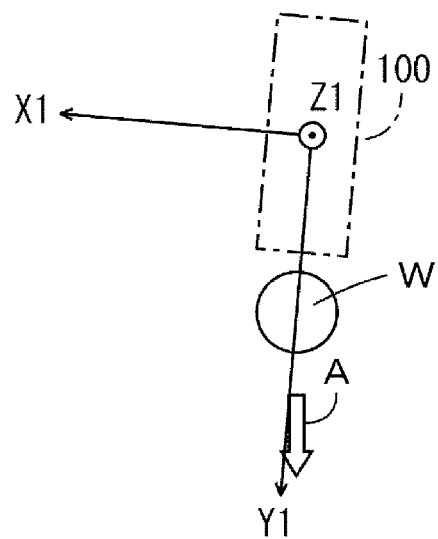
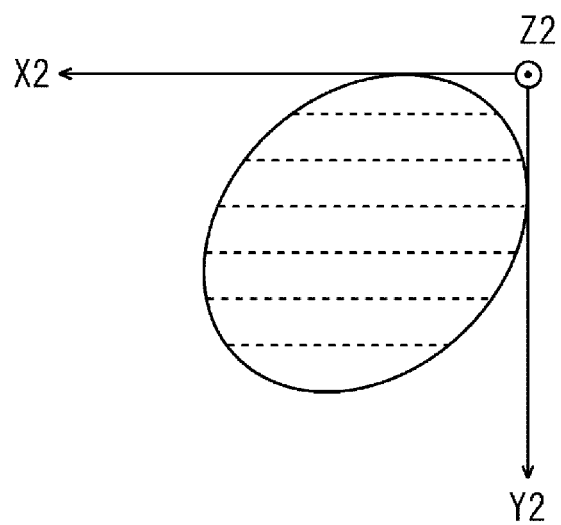

OPTICAL DISPLACEMENT MEASUREMENT SYSTEM, PROCESSING DEVICE, AND OPTICAL DISPLACEMENT METER

CROSS-REFERENCE TO RELATED APPLICATIONS

The present application claims foreign priority based on Japanese Patent Application No. 2021-037798, filed Mar. 9, 2021, the contents of which are incorporated herein by reference.

BACKGROUND OF THE INVENTION

1. Field of the Invention

The present invention relates to an optical displacement measurement system, a processing device, an optical displacement measurement method, and an optical displacement measurement program for detecting a displacement of a measurement object by a triangulation method.

2. Description of Related Art

As devices that measure profiles of measurement objects, optical displacement meters of an optical cutting method are known.

For example, optical displacement meters described in JP 2020-27053 A and JP 2020-27054 A each include an imaging head including a light projecting unit and a two-dimensional light receiving element. A measurement object is irradiated with band-shaped light having a line-shaped cross section from the light projecting unit, and reflected light thereof is received by the two-dimensional light receiving element. A profile of the measurement object is measured based on a position of a peak of a light receiving amount distribution obtained by the light receiving element.

A shape of the measurement object can be measured by stacking a plurality of profiles measured for a plurality of positions of the measurement object. Here, in order to accurately measure the shape of the measurement object without distortion, it is necessary to attach the imaging head such that a reference direction of the imaging head is not misaligned from a direction in which the profiles need to be stacked. However, it is difficult to attach the imaging head such that there is no misalignment in a case where a worker is not skilled. In addition, it takes a long time to attach the imaging head such that there is no deviation even in a case where a worker is skilled. Therefore, it is not possible to easily measure an accurate shape of the measurement object.

SUMMARY OF THE INVENTION

An object of the present invention is to provide an optical displacement measurement system, a processing device, an optical displacement measurement method, and an optical displacement measurement program capable of easily measuring an accurate shape of a measurement object.

(1) According to one embodiment of the invention, an optical displacement measurement system of an optical cutting method includes: a light projecting unit in which a first direction, a second direction, and a third direction intersecting with each other are defined in advance and which emits slit light spreading in the first direction or spot light scanning in the first direction, in the second direction; a light receiving unit which includes a plurality of pixels arranged two-dimensionally, receives light reflected at each position in the first direction of a workpiece having a spherical surface, and outputs a light reception signal indicating a light receiving amount; a profile generation unit which generates profile data representing a profile of the workpiece having the spherical surface in a plane defined by the first direction and the second direction based on the light reception signal; a shape generation unit which synthesizes a plurality of profiles generated to correspond to each position in the third direction when the workpiece having the spherical surface is moved relative to the light projecting unit and the light receiving unit in a direction corresponding to the third direction, and generates three-dimensional data representing a three-dimensional shape of the workpiece having the spherical surface; a sphere information calculation unit which calculates a parameter of a spherical surface defined by a plurality of points included in the three-dimensional data; a distortion amount calculation unit which calculates a distortion amount of the spherical surface based on the parameter; and a correction value calculation unit which calculates at least one of a first rotation angle correction value about a first axis parallel to the first direction and a second rotation angle correction value about a second axis parallel to the second direction in the plurality of pieces of profile data constituting the three-dimensional data so as to reduce the distortion amount.

In the optical displacement measurement system, the profile generation unit generates the profile data of the workpiece corresponding to each position in the third direction in response to the relative movement of the workpiece in the direction corresponding to the third direction of the light projecting unit. The shape generation unit generates the three-dimensional data of the workpiece based on the plurality of pieces of profile data. Here, even when the third direction is misaligned with respect to the direction of the relative movement of the workpiece, the parameter of the spherical surface defined by the plurality of points included in the three-dimensional data generated by the shape generation unit is calculated by the sphere information calculation unit.

The distortion amount calculation unit calculates the distortion amount of the spherical surface based on the parameter calculated by the sphere information calculation unit. The correction value calculation unit calculates at least one of the first rotation angle correction value about the first axis parallel to the first direction and the second rotation angle correction value about the second axis parallel to the second direction in the plurality of pieces of profile data constituting the three-dimensional data so as to reduce the distortion amount calculated by the distortion amount calculation unit.

According to this configuration, it is easy to generate the three-dimensional data representing the three-dimensional shape of the workpiece when the distortion amount of the spherical surface is small by using at least one of the first and second rotation angle correction values about the first and second axes calculated by the correction value calculation unit. As a result, an accurate shape of the workpiece can be easily measured.

(2) The sphere information calculation unit may calculate a parameter of a first spherical surface defined by a first point, a second point, a third point, and a fourth point included in the three-dimensional data and calculate a parameter of a second spherical surface defined by a fifth point, a sixth point, a seventh point, and an eighth point included in the three-dimensional data, and the distortion amount calculation unit may calculate the distortion amount based on deviation between the parameter of the first spherical surface and the parameter of the second spherical surface. According to this configuration, the distortion amount of the spherical surface can be easily calculated even when an actual dimension of the spherical surface of the workpiece is unknown.

(3) The shape generation unit may correct the three-dimensional data by rotating the plurality of pieces of profile data constituting the three-dimensional data about the first axis and the second axis based on the first rotation angle correction value and the second rotation angle correction value. In such a case, it is possible to automatically generate the three-dimensional data representing the three-dimensional shape of the workpiece when the distortion amount of the spherical surface is small without adjusting attachment of the light projecting unit and the light receiving unit. As a result, it is possible to more easily measure the accurate shape of the workpiece.

(4) The correction value calculation unit may change the first rotation angle correction value and the second rotation angle correction value each by a predetermined amount, and the sphere information calculation unit and the distortion amount calculation unit may repeat the calculation of the parameter and the calculation of the distortion amount, respectively, until the distortion amount is equal to or less than a predetermined threshold. In such a case, it is easy to automatically generate the three-dimensional data representing the three-dimensional shape of the workpiece when the distortion amount of the spherical surface is small.

(5) A plurality of sets of the light projecting unit and the light receiving unit may be provided so as to correspond to each other. The profile generation unit, the shape generation unit, the sphere information calculation unit, the distortion amount calculation unit, and the correction value calculation unit may operate to rotate the plurality of pieces of profile data constituting a plurality of pieces of the three-dimensional data, which correspond to the sets of the light projecting unit and the light receiving unit, about the first axis and the second axis based on the first rotation angle correction value and the second rotation angle correction value calculated for each of the sets of the light projecting unit and the light receiving unit. The sphere information calculation unit may calculate a reference point related to the spherical surface based on the plurality of pieces of three-dimensional data for each of the sets of the light projecting unit and the light receiving unit after the plurality of pieces of profile data are rotated. The correction value calculation unit may calculate a first translation amount correction value parallel to the first direction, a second translation amount correction value parallel to the second direction, and a third translation amount correction value parallel to the third direction in the plurality of pieces of profile data constituting at least one piece of the three-dimensional data so as to reduce deviation between a plurality of the reference points.

According to this configuration, even when the plurality of pieces of three-dimensional data corresponding to the plurality of sets of the light projecting unit and the light receiving unit are misaligned in the first to third directions, the first to third translation amount correction values are calculated such that the deviation between the reference points related to the spherical surface is reduced. Therefore, it is easy to generate the plurality of pieces of three-dimensional data representing the three-dimensional shape of the workpiece when the deviation between the reference points is small by using the first to third translation amount correction values.

(6) The shape generation unit may correct the three-dimensional data by translating the plurality of pieces of profile data constituting the at least one piece of three-dimensional data in the first direction, the second direction, and the third direction based on the first translation amount correction value, the second translation amount correction value, and the third translation amount correction value. In such a case, it is possible to automatically generate the plurality of pieces of three-dimensional data representing the three-dimensional shape of the workpiece when the deviation between the reference points of the spherical surface is small without adjusting attachment of the light projecting units and the light receiving units.

(7) The spherical surface may have a characteristic portion, and the correction value calculation unit may calculate a third rotation angle correction value about a third axis parallel to the third direction in the plurality of pieces of profile data constituting the at least one piece of three-dimensional data such that the characteristic portions in the plurality of pieces of the three-dimensional data match after the plurality of pieces of profile data constituting the at least one piece of three-dimensional data are translated in the first direction, the second direction, and the third direction.

According to this configuration, even when the plurality of pieces of three-dimensional data corresponding to the plurality of sets of the light projecting unit and the light receiving unit are misaligned about the third axis, the third rotation angle correction value is calculated such that the characteristic portions in the plurality of pieces of three-dimensional data match. Therefore, it is easy to generate the plurality of pieces of three-dimensional data representing the three-dimensional shape of the workpiece when the characteristic portions match by using the third rotation angle correction value.

(8) The shape generation unit may correct the three-dimensional data by rotating the plurality of pieces of profile data constituting the at least one piece of three-dimensional data about the third axis based on the third rotation angle correction value. In such a case, it is possible to automatically generate the plurality of pieces of three-dimensional data representing the three-dimensional shape of the workpiece when the characteristic portions match without adjusting attachment of the light projecting units and the light receiving units.

(9) The optical displacement measurement system may further include a synthesis unit which synthesizes the plurality of pieces of three-dimensional data after the plurality of pieces of profile data constituting the at least one piece of three-dimensional data are rotated about the third axis to generate synthesized data representing a three-dimensional shape of the workpiece having the spherical surface.

In such a case, rotational misalignment about the first to third axes and translational misalignment in the first to third directions are reduced in the plurality of pieces of three-dimensional data, and thus, it is possible to synthesize the plurality of pieces of three-dimensional data. Therefore, the synthesized data indicating a more accurate three-dimensional shape of the workpiece can be easily generated by synthesizing the plurality of pieces of three-dimensional data.

(10) The optical displacement measurement system may further include a notification unit which notifies at least one of the first rotation angle correction value and the second rotation angle correction value. In such a case, a user can easily perform accurate attachment adjustment of the light projecting unit and the light receiving unit such that the distortion amount of the spherical surface is small by using at least one of the first rotation angle correction value and the second rotation angle correction value notified by the notification unit. As a result, an accurate shape of the workpiece can be easily measured.

(11) According to another embodiment of the invention, a processing device used for an optical displacement meter of an optical cutting method includes: a light projecting unit in which a first direction, a second direction, and a third direction intersecting with each other are defined in advance and which emits slit light spreading in the first direction or spot light scanning in the first direction, in the second direction; and a light receiving unit which includes a plurality of pixels arranged two-dimensionally, receives reflected light from each position in the first direction of a workpiece having a spherical surface, and outputs a light reception signal indicating a light receiving amount, the processing device includes: a profile generation unit which generates profile data representing a profile of the workpiece having the spherical surface in a plane defined by the first direction and the second direction based on the light reception signal; a shape generation unit which synthesizes a plurality of profile data generated to correspond to each position in the third direction when the workpiece having the spherical surface is moved relative to the light projecting unit and the light receiving unit in a direction corresponding to the third direction, and generates three-dimensional data representing a three-dimensional shape of the workpiece having the spherical surface; a sphere information calculation unit which calculates a parameter of a spherical surface defined by a plurality of points included in the three-dimensional data; a distortion amount calculation unit which calculates a distortion amount of the spherical surface based on the parameter; and a correction value calculation unit which calculates at least one of a first rotation angle correction value about a first axis parallel to the first direction and a second rotation angle correction value about a second axis parallel to the second direction in the plurality of pieces of profile data constituting the three-dimensional data so as to reduce the distortion amount.

In the processing device, it is easy to generate the three-dimensional data representing the three-dimensional shape of the workpiece when the distortion amount of the spherical surface is small by using at least one of the first and second rotation angle correction values about the first and second axes calculated by the correction value calculation unit. As a result, an accurate shape of the workpiece can be easily measured.

(12) According to still another embodiment of the invention, an optical displacement measurement method used for an optical displacement meter of an optical cutting method includes: a light projecting unit in which a first direction, a second direction, and a third direction intersecting with each other are defined in advance and which emits slit light spreading in the first direction or spot light scanning in the first direction, in the second direction; and a light receiving unit which includes a plurality of pixels arranged two-dimensionally, receives reflected light from each position in the first direction of a workpiece having a spherical surface, and outputs a light reception signal indicating a light receiving amount, the optical displacement measurement method includes: generating profile data representing a profile of the workpiece having the spherical surface in a plane defined by the first direction and the second direction based on the light reception signal; synthesizing a plurality of profile data generated to correspond to each position in the third direction when the workpiece having the spherical surface is moved relative to the light projecting unit and the light receiving unit in a direction corresponding to the third direction, and generating three-dimensional data representing a three-dimensional shape of the workpiece having the spherical surface; calculating a parameter of a spherical surface defined by a plurality of points included in the three-dimensional data; calculating a distortion amount of the spherical surface based on the parameter; and calculating at least one of a first rotation angle correction value about a first axis parallel to the first direction and a second rotation angle correction value about a second axis parallel to the second direction in the plurality of pieces of profile data constituting the three-dimensional data so as to reduce the distortion amount.

According to the optical displacement measurement method, it is easy to generate the three-dimensional data representing the three-dimensional shape of the workpiece when the distortion amount of the spherical surface is small by using at least one of the calculated first and second rotation angle correction values about the first and second axes. As a result, an accurate shape of the workpiece can be easily measured.

(13) According to still another embodiment of the invention, an optical displacement measurement program used for an optical displacement meter of an optical cutting method includes: a light projecting unit in which a first direction, a second direction, and a third direction intersecting with each other are defined in advance and which emits slit light spreading in the first direction or spot light scanning in the first direction, in the second direction; and a light receiving unit which includes a plurality of pixels arranged two-dimensionally, receives reflected light from each position in the first direction of a workpiece having a spherical surface, and outputs a light reception signal indicating a light receiving amount, the optical displacement measurement program is configured to cause a processing device to execute: a process of generating profile data representing a profile of the workpiece having the spherical surface in a plane defined by the first direction and the second direction based on the light reception signal; a process of synthesizing a plurality of profile data generated to correspond to each position in the third direction when the workpiece having the spherical surface is moved relative to the light projecting unit and the light receiving unit in a direction corresponding to the third direction, and generating three-dimensional data representing a three-dimensional shape of the workpiece having the spherical surface; a process of calculating a parameter of a spherical surface defined by a plurality of points included in the three-dimensional data; a process of calculating a distortion amount of the spherical surface based on the parameter; and a process of calculating at least one of a first rotation angle correction value about a first axis parallel to the first direction and a second rotation angle correction value about a second axis parallel to the second direction in the plurality of pieces of profile data constituting the three-dimensional data so as to reduce the distortion amount.

According to the optical displacement measurement program, it is easy to generate the three-dimensional data representing the three-dimensional shape of the workpiece when the distortion amount of the spherical surface is small by using at least one of the calculated first and second rotation angle correction values about the first and second axes. As a result, an accurate shape of the workpiece can be easily measured.

According to the present invention, the accurate shape of the measurement object can be easily measured.

BRIEF DESCRIPTION OF THE DRAWINGS

FIG. 11 is a view visually illustrating detected peak positions and peak luminance values;

FIG. 12 is a view illustrating three-dimensional data;

FIG. 13 is a view illustrating luminance image data;

FIG. 15 is a view illustrating three-dimensional data when the imaging head is attached in a misaligned state;

FIG. 16 is a view illustrating three-dimensional data when the imaging head is attached in a misaligned state;

DETAILED DESCRIPTION OF PREFERRED EMBODIMENTS

Figure 1:
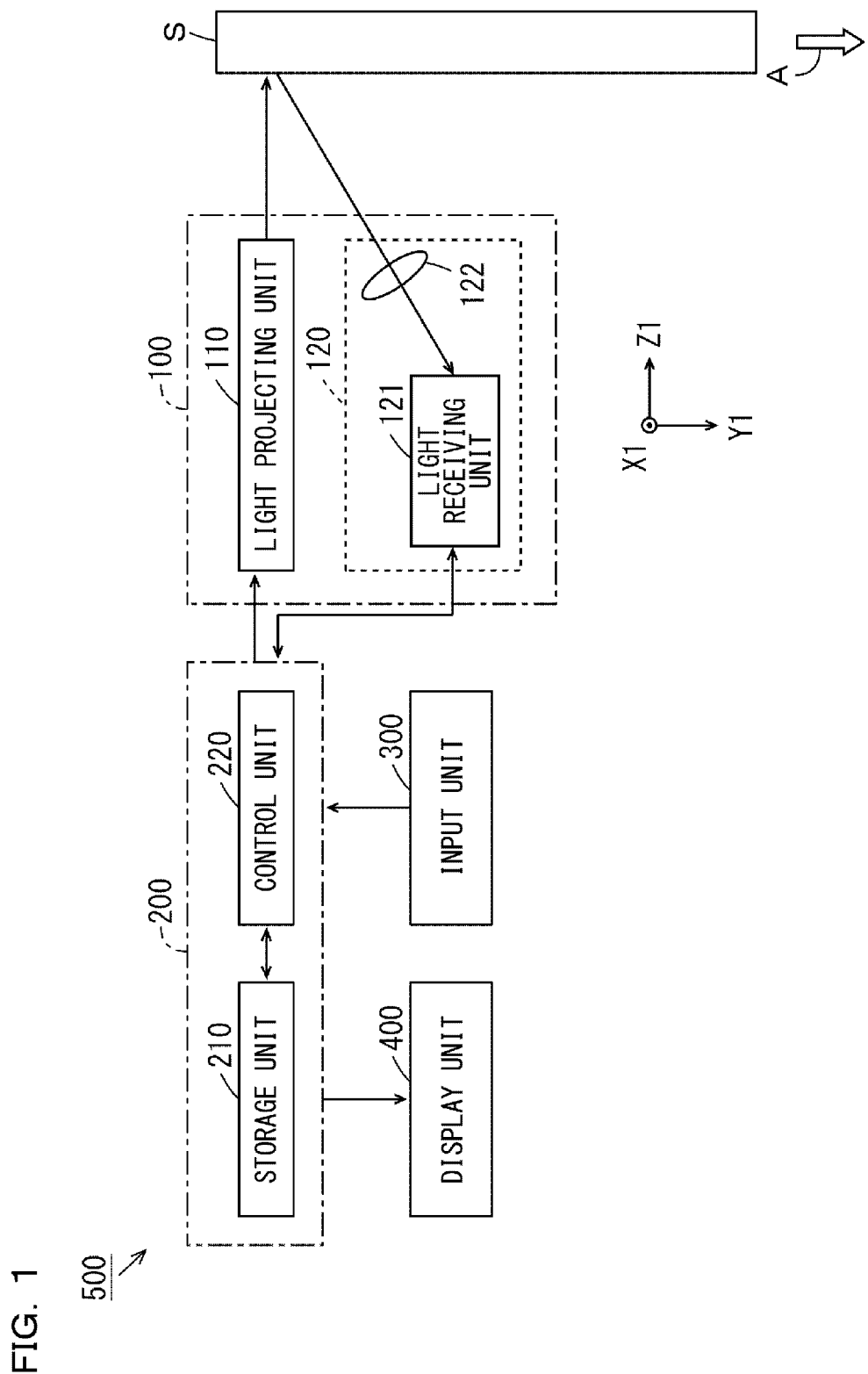
FIG. 1 is a block diagram illustrating a configuration of an optical displacement measurement system according to a first embodiment of the present invention.

[1] First Embodiment (1) Configuration of Optical Displacement Measurement System Hereinafter, an optical displacement measurement system, a processing device, an optical displacement measurement method, and an optical displacement measurement program according to embodiments of the present invention will be described with reference to the drawings. FIG. 1 is a block diagram illustrating a configuration of an optical displacement measurement system according to a first embodiment of the present invention; An optical displacement measurement system 500 is used to measure a three-dimensional shape of a measurement object S moved at a constant speed by a belt conveyor, for example. In FIG. 1, a movement direction A of the measurement object S is indicated by a white arrow.

As illustrated in FIG. 1, the optical displacement measurement system 500 includes an imaging head 100, a processing device 200, an input unit 300, and a display unit 400. The optical displacement measurement system 500 may include a plurality of the imaging heads 100. The imaging head 100 is configured to be attachable to and detachable from the processing device 200. The imaging head 100 and the processing device 200 may be configured to be integrated. Alternatively, the processing device 200 may be housed in the imaging head 100.

In the imaging head 100, an X1 direction, a Y1 direction, and a Z1 direction orthogonal to each other are defined in advance. In addition, axes parallel to the X1 direction and the Z1 direction are referred to as an X1 axis and a Z1 axis, respectively. In FIG. 1, the X1 direction, the Y1 direction, and the Z1 direction are indicated by arrows X1, Y1, and Z1, respectively. The imaging head 100 is attached such that the Y1 direction is substantially parallel to the movement direction A of the measurement object S. The imaging head 100 includes a light projecting unit (light projector) 110 and an imaging unit 120. The light projecting unit 110 and the imaging unit 120 constitute an optical displacement meter of an optical cutting method.

The light projecting unit 110 includes a light source, and is configured to be capable of emitting line-shaped light, which spreads in the X1 direction, in the Z1 direction. The light source is, for example, a laser diode (LD), but the embodiment is not limited thereto. The light source may be a light emitting diode (LED) or a super luminescent diode (SLD). In addition, the light projecting unit 110 may be configured to be capable of emitting light scanning in the X1 direction, in the Z1 direction instead of the line-shaped light spreading in the X1 direction.

The imaging unit 120 includes a light receiving unit (light receiver) 121 and a light-receiving lens 122. Light reflected at each position in the X1 direction of the measurement object S is incident on the light receiving unit 121 through the light-receiving lens 122. The light receiving unit 121 includes, for example, a complementary metal oxide semiconductor (CMOS) sensor, and has a light receiving surface on which a plurality of pixels are two-dimensionally disposed. Two directions orthogonal to each other on the light receiving surface of the light receiving unit 121 are referred to as an X2 direction and a Z2 direction, respectively. In addition, a direction orthogonal to the X2 direction and the Z2 direction is referred to as a Y2 direction. The X2 direction, the Y2 direction, and the Z2 direction correspond to the X1 direction, the Y1 direction, and the Z1 direction, respectively. Axes parallel to the X2 direction, the Y2 direction, and the Z2 direction are referred to as an X2 axis, a Y2 axis, and a Z2 axis, respectively. A light reception signal indicating the amount of light received by the light receiving unit 121 is output to the processing device 200.

The processing device 200 includes a storage unit 210 and a control unit 220. The storage unit 210 includes a random access memory (RAM), a read-only memory (ROM), a hard disk, a semiconductor memory, or the like, and stores an optical displacement measurement program. The optical displacement measurement program may be provided in a form stored in a computer-readable storage medium and installed in the storage unit 210. Alternatively, in a case where the processing device 200 is connected to a network such as the Internet, the optical displacement measurement program may be installed in the storage unit 210 from a server (a cloud server) on the network.

The control unit 220 includes, for example, a central processing unit (CPU), and controls an operation of the imaging head 100 based on the optical displacement measurement program. In addition, the control unit 220 is configured to be capable of generate profile data, three-dimensional data, luminance image data, or the like of the measurement object S. The profile data indicates a profile of the measurement object S in a plane defined by the X2 direction and the Z2 direction. The three-dimensional data indicates a three-dimensional shape of the measurement object S. The luminance image data indicates a surface image (texture image) of the measurement object S.

The imaging head 100 is preferably attached such that the Y1 direction is not misaligned from the relative movement direction A of the measurement object S. However, it is not easy to attach the imaging head 100 such that the Y1 direction is not misaligned from the movement direction A of the measurement object S. When the imaging head 100 is attached in a state where the Y1 direction is misaligned from the movement direction A of the measurement object S, the three-dimensional data representing the three-dimensional shape of the measurement object S is distorted. Therefore, the processing device 200 performs calibration processing for generating three-dimensional data representing an accurate three-dimensional shape of the measurement object S. The processing device 200 will be described later in detail.

The input unit 300 includes a keyboard or a pointing device, and is configured to be operable by a user. The pointing device includes a mouse, a joystick, or the like. The input unit 300 may include a console dedicated to the processing device 200. The user can perform predetermined designation on the processing device 200 by operating the input unit 300.

The display unit 400 includes, for example, a liquid crystal display panel or an organic electroluminescence (EL) panel. The display unit 400 can display the profile data, the three-dimensional data, the luminance image data, or the like of the measurement object S based on the profile data, the three-dimensional data, or the luminance image data generated by the processing device 200. In addition, the display unit 400 can display a graphical user interface (GUI) for receiving designation from the user.

Figure 2:
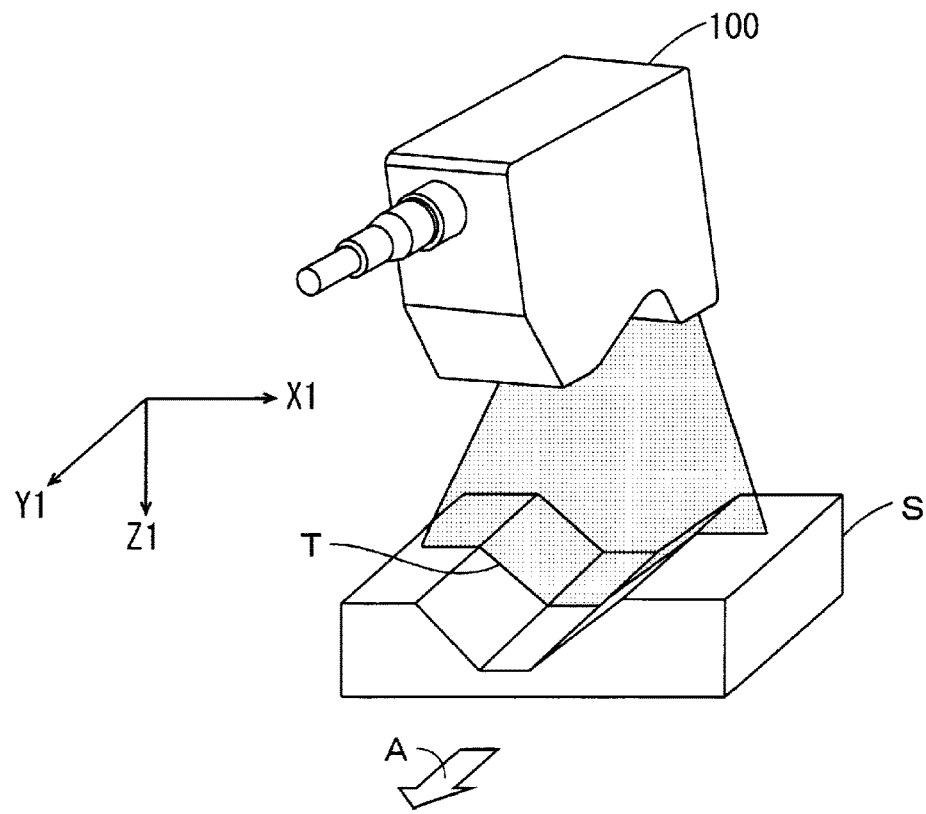
FIG. 2 is an external perspective view of an imaging head and a measurement object.
Figure 3:
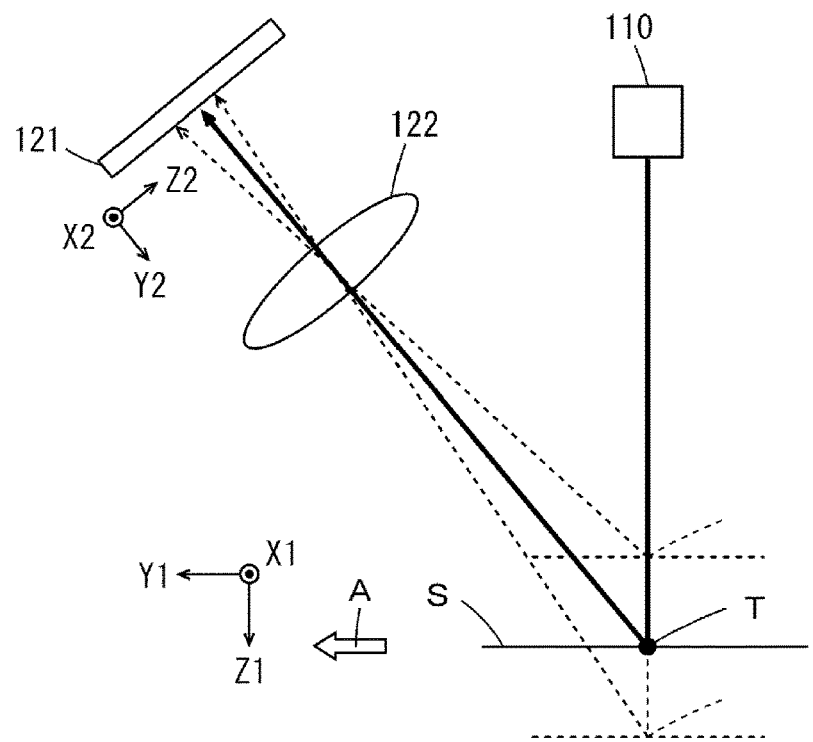
FIG. 3 is a view illustrating a relationship between a light irradiation position on a surface of the measurement object and a light incident position on a light receiving unit.
Figure 4:
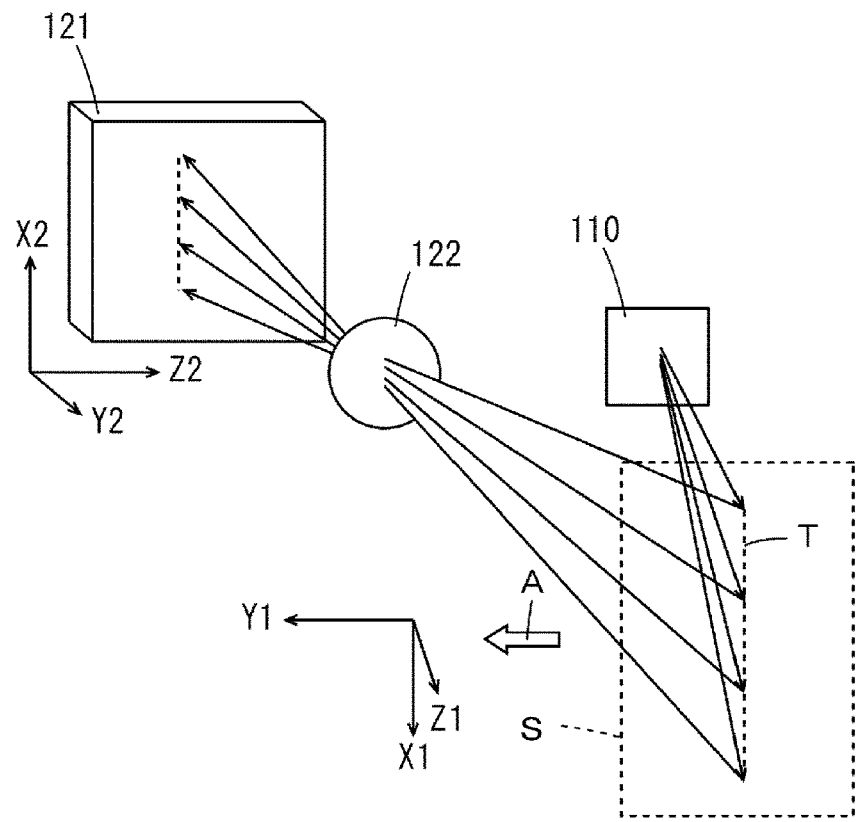
FIG. 4 is a view illustrating the relationship between the light irradiation position on the surface of the measurement object and the light incident position on the light receiving unit.

(2) Profile Data, Three-Dimensional Data, and Luminance Image Data FIG. 2 is an external perspective view of the imaging head 100 and the measurement object S. FIGS. 3 and 4 are views illustrating a relationship between a light irradiation position on the surface of the measurement object S and a light incident position on the light receiving unit 121. The measurement object S in the example of FIG. 2 has a groove, which has a trapezoidal cross section extending in the Y1 direction, on the surface. The imaging head 100 irradiates the surface of the measurement object S moving in the movement direction A with the line-shaped light along the X1 direction. Hereinafter, a linear region of the surface at one position in the Y1 direction of the measurement object S irradiated with the line-shaped light is referred to as an irradiation region T.

As illustrated in FIG. 3, light reflected by the irradiation region T is incident on the light receiving unit 121 through the light-receiving lens 122. In such a case, when a reflection position of light in the irradiation region T is different in the Z1 direction, an incident position of the reflected light on the light receiving unit 121 is different in the Z2 direction. In addition, when a reflection position of light in the irradiation region T is different in the X1 direction as illustrated in FIG. 4, an incident position of the reflected light on the light receiving unit 121 is different in the X2 direction. As a result, the light incident position of the light receiving unit 121 in the Z2 direction represents a position of the irradiation region T in the Z1 direction, and the light incident position of the light receiving unit 121 in the X2 direction represents the position of the irradiation region T in the X1 direction.

Figure 5:
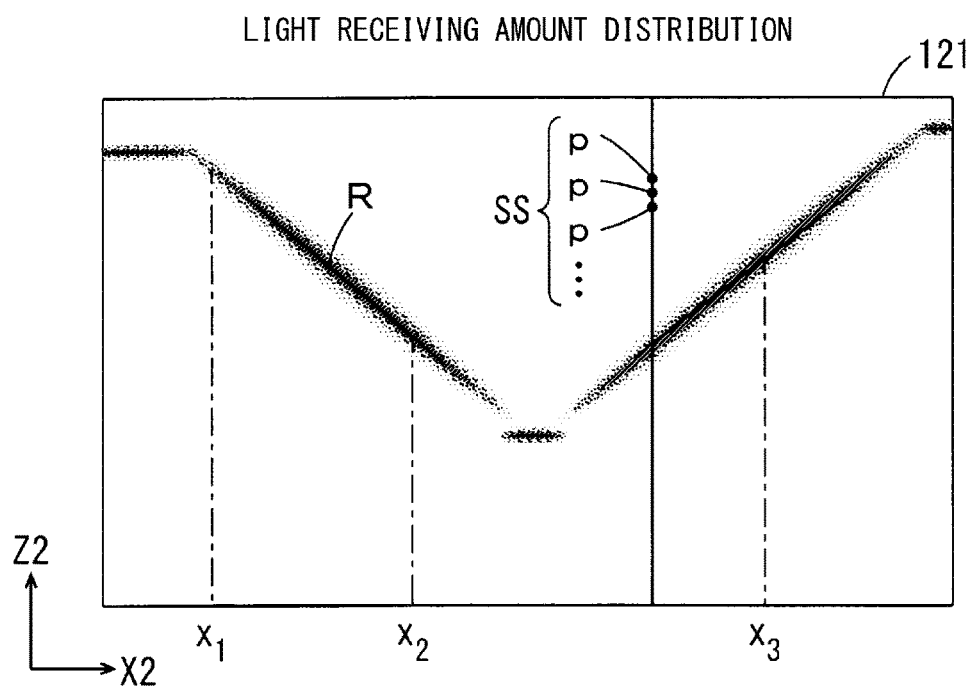
FIG. 5 is a view illustrating a light receiving amount distribution on a light receiving surface of the light receiving unit.

FIG. 5 is a view illustrating a light receiving amount distribution on the light receiving surface of the light receiving unit 121. The light receiving amount distribution is generated based on a light receiving amount of each of the pixels p of the light receiving unit 121 in FIG. 5. As described above, the plurality of pixels p of the light receiving unit 121 are two-dimensionally disposed along the X2 direction and the Z2 direction. Each of the arrays of the plurality of pixels p along the Z2 direction is referred to as a pixel array SS. Therefore, a plurality of pixel arrays SS are arranged in the X2 direction on the light receiving surface of the light receiving unit 121, and each of the pixel arrays SS includes the plurality of pixels p along the Z2 direction.

Each of the pixels p is not limited to being configured using one pixel (minimum unit of pixel) of an imaging device such as a CMOS sensor, and may be configured using a plurality of pixels. For example, each of the pixels p may be configured using four pixels arranged in 2×2, or each of the pixels p may be configured using nine pixels arranged in 3×3. Therefore, when a binning process is performed using a plurality of pixels as one unit, each of the pixels p may be configured using the plurality of pixels included in the one unit.

Figure 6:
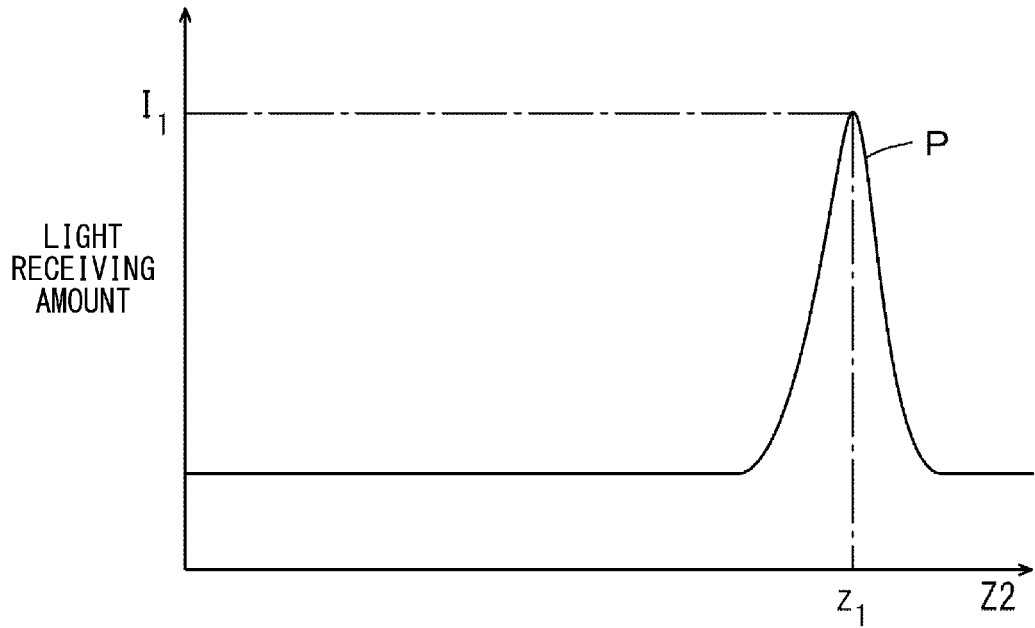
FIG. 6 is a view illustrating a light receiving amount distribution in a pixel array at one position in an X2 direction.
Figure 7:
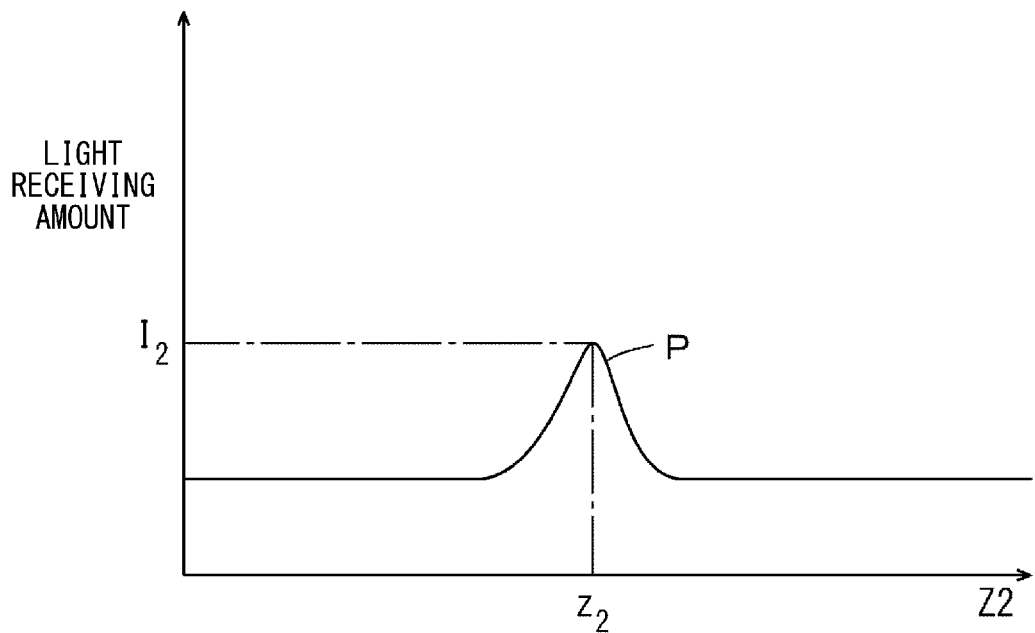
FIG. 7 is a view illustrating a light receiving amount distribution in a pixel array at another position in the X2 direction.
Figure 8:
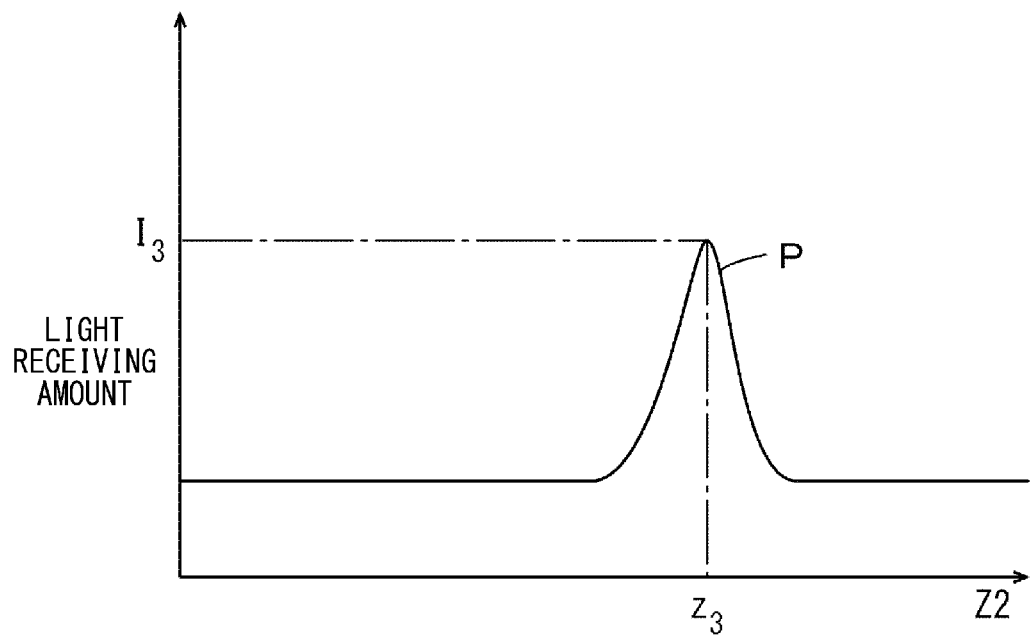
FIG. 8 is a view illustrating a light receiving amount distribution in a pixel array at still another position in the X2 direction.

The light reflected from the irradiation region T in FIG. 2 is incident on a light reception region R illustrated in FIG. 5. As a result, the light receiving amount of the light reception region R increases in the light reception signal. FIG. 6 is a view illustrating a light receiving amount distribution in the pixel array SS at one position $x_1$ in the X2 direction. FIG. 7 is a view illustrating a light receiving amount distribution in the pixel array SS at another position $x_2$ in the X2 direction. FIG. 8 is a view illustrating a light receiving amount distribution in the pixel array SS at still another position $x_3$ in the X2 direction. In FIGS. 6 to 8, the horizontal axis represents a position in the Z2 direction, and the vertical axis represents the light receiving amount.

As illustrated in FIGS. 6 to 8, a peak P (maximum value) corresponding to the light reception region R in FIG. 5 appears in the light receiving amount distribution in each of the pixel arrays SS. A position of the peak P in the Z2 direction is referred to as a peak position, and a luminance value (light receiving amount) of the peak position is referred to as a peak luminance value. In the pixel array SS at the position $x_1$, the peak position is $z_1$, and the peak luminance value is $I_1$. In the pixel array SS at the position $x_2$, the peak position is $z_2$, and the peak luminance value is $I_2$. In the pixel array SS at the position $x_3$, the peak position is $z_3$, and the peak luminance value is $I_3$. The peak position indicates the surface (reflection surface) of the measurement object S in the irradiation region T.

One peak position and one peak luminance value are detected in each of a plurality of light receiving amount distributions corresponding to the plurality of pixel arrays SS. Note that a plurality of peaks may appear in the light receiving amount distribution in the pixel array SS due to a plurality of times of reflection or diffuse reflection. In such a case, one peak position and a peak luminance value corresponding to the peak position are detected in a state where a process of excluding a false peak that does not indicate the surface of the measurement object S in the irradiation region T has been performed. The detected peak luminance value indicates a surface state of the measurement object S in the irradiation region T, and is used to generate luminance image data.

Figure 9:
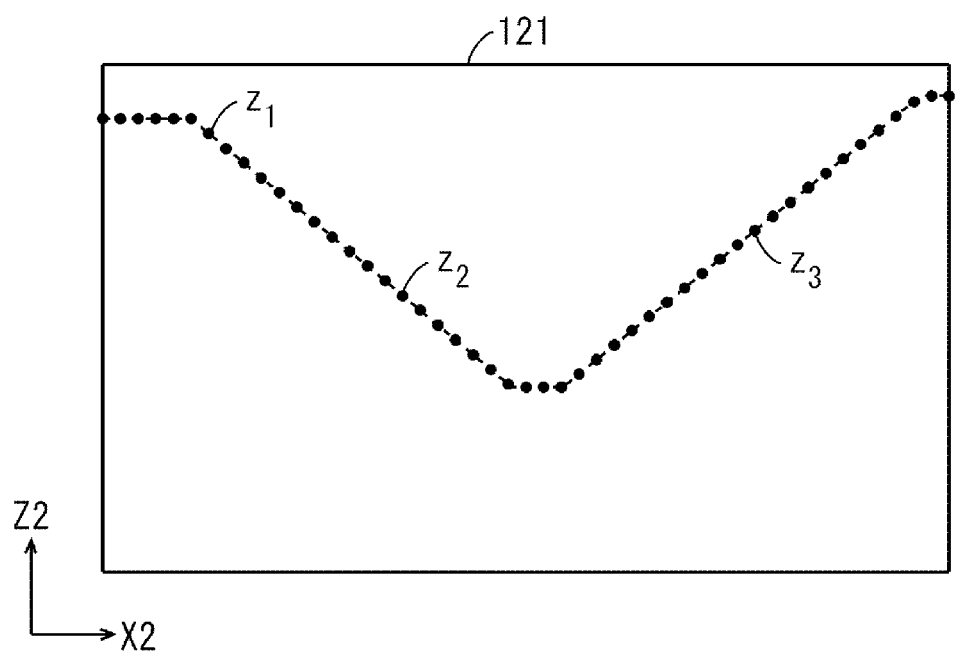
FIG. 9 is a view illustrating all peak positions in the light receiving amount distribution of FIG. 5.
Figure 10:
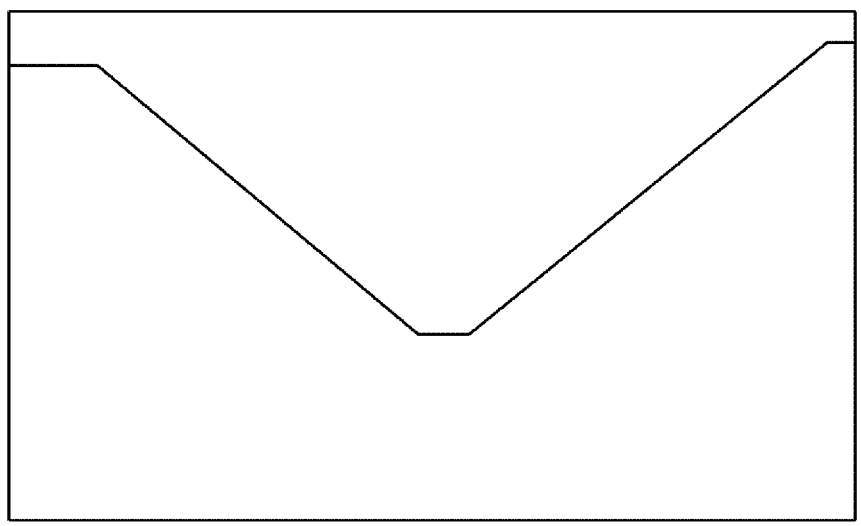
FIG. 10 is a view illustrating profile data acquired based on the peak positions in FIG. 9.

Profile data representing a profile of the measurement object S (a shape of the irradiation region T) is generated based on the peak position detected for each of the pixel arrays SS. FIG. 9 is a view illustrating all peak positions in the light receiving amount distribution of FIG. 5. FIG. 10 is a view illustrating profile data acquired based on the peak positions in FIG. 9. As illustrated in FIGS. 9 and 10, all the detected peak positions including the peak positions $z_1$ to $z_3$ are indicated as a continuous line, thereby generating the profile data indicating the profile of the measurement object S.

As the measurement object S moves in the movement direction A, light reflected by a plurality of the irradiation regions T at a plurality of positions in the Y1 direction of the measurement object S is sequentially incident on the light receiving unit 121. As a result, the peak positions and peak luminance values in the pixel arrays SS at a plurality of positions in the X2 direction are detected for each of the positions in the Y2 direction corresponding to the Y1 direction.

FIG. 11 is a view visually illustrating detected peak positions and peak luminance values. As illustrated in FIG. 11, a peak position and a peak luminance value $I_{ij}$ are detected in association with each other for a point (each of i and j is an integer of one or more) defined by a position $x_i$ in the X2 direction and a position $y_j$ in the Y2 direction. As a result, the position $x_i$, the position $y_j$, the peak position $z_{ij}$, and the peak luminance value $I_{ij}$ are stored in association with each other in the storage unit 210 of FIG. 1.

FIG. 12 is a view illustrating three-dimensional data. As illustrated in FIG. 12, the three-dimensional data is generated by arranging the peak positions $z_{ij}$ respectively associated with the points defined by the positions $x_i$ and $y_j$. That is, the three-dimensional data is generated by arranging pieces of profile data, generated to correspond to the plurality of positions $y_j$, are arranged in the Y2 direction.

FIG. 13 is a view illustrating luminance image data. As illustrated in FIG. 13, the luminance image data is generated by arranging the peak luminance values $I_{ij}$ respectively associated with the points defined by the positions $x_i$ and $y_j$. That is, the luminance image data is generated by arranging the peak luminance values (hereinafter, referred to as a peak luminance array), detected to correspond to the pieces of profile data of the plurality of positions $y_j$, in the Y2 direction.

In this manner, the three-dimensional data and the luminance image data are generated by the movement of the measurement object S relative to the imaging head 100. Although the measurement object S is moved in the present embodiment, the embodiment is not limited thereto. It suffices that the measurement object S is moved relative to the imaging head 100. Therefore, the imaging head 100 may be moved without moving the measurement object S. Even in such a case, the three-dimensional data and the luminance image data of the measurement object S can be generated.

(3) Processing Device (Processor)

The processing device (processor) 200 performs calibration processing for generating three-dimensional data representing an accurate three-dimensional shape using the measurement object S having a spherical surface as an adjustment workpiece. The adjustment workpiece may be a sphere such as a ping-pong ball used in a table tennis match, but the embodiment is not limited thereto. The adjustment workpiece is not necessarily a sphere as long as at least a part of the adjustment workpiece has a spherical surface.

Figure 14:
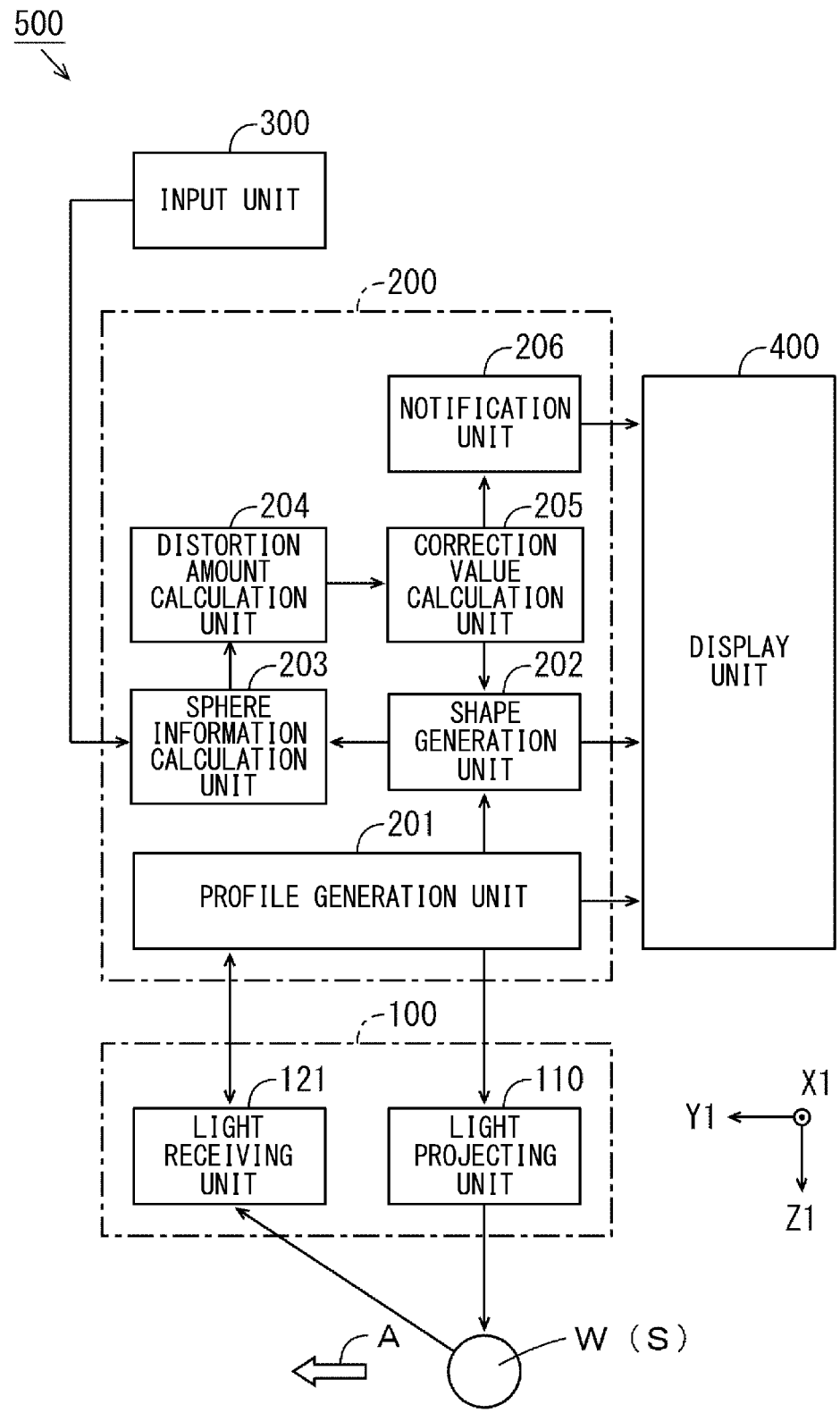
FIG. 14 is a block diagram illustrating a configuration of a processing device in FIG. 1.

FIG. 14 is a block diagram illustrating a configuration of the processing device 200 in FIG. 1. As illustrated in FIG. 14, the processing device 200 includes a profile generation unit (profile generator) 201, a shape generation unit (shape generator) 202, a sphere information calculation unit (shape information calculator) 203, a distortion amount calculation unit (distortion amount calculator) 204, a correction value calculation unit (correction value calculator) 205, and a notification unit (notifier) 206 as functional units. The functional units of the processing device 200 are implemented as the control unit 220 in FIG. 1 executes the optical displacement measurement program. Some or all of the functional units of the processing device 200 may be implemented by hardware such as an electronic circuit.

The profile generation unit 201 controls the light projecting unit 110 so as to periodically emit light in the Z1 direction and controls the light receiving unit 121 to receive the light. In such a case, an adjustment workpiece W moving in the movement direction A is periodically irradiated with the light. In addition, the reflected light from the adjustment workpiece W is repeatedly received by the light receiving unit 121, and a light reception signal indicating a light receiving amount is output.

The profile generation unit 201 generates pieces of profile data corresponding to the respective positions in the Y2 direction of the moving adjustment workpiece W based on the light reception signal output from the light receiving unit 121. In addition, the profile generation unit 201 detects a peak luminance array corresponding to each piece of the profile data from the light reception signal. The profile generation unit 201 can display q profile of the adjustment workpiece W on the display unit 400 based on the generated profile data.

The shape generation unit 202 arranges the plurality of pieces of profile data, generated by the profile generation unit 201, in the Y2 direction to generate three-dimensional data. The shape generation unit 202 also arranges the peak luminance arrays detected by the profile generation unit 201 in the Y2 direction to generate luminance image data. The shape generation unit 202 can display a three-dimensional shape or a luminance image of the adjustment workpiece W on the display unit 400 based on the generated three-dimensional data or luminance image data.

The sphere information calculation unit 203 calculates a parameter of a spherical surface defined by a plurality of points included in the three-dimensional data generated by the shape generation unit 202. Examples of the parameter include a center position of the spherical surface and a radius of the spherical surface. Specifically, the user operates the input unit 300 while visually recognizing the three-dimensional shape of the adjustment workpiece W displayed on the display unit 400, thereby designating first to fourth points and fifth to eighth points of a portion corresponding to the spherical surface of the adjustment workpiece W on the GUI. The first to fourth points and the fifth to eighth points may partially overlap.

The sphere information calculation unit 203 calculates a center position $(X_{c1}, Y_{c1}, Z_{c1})$ and a radius $R_1$ of a first spherical surface defined by the designated first to fourth points as a first parameter of the spherical surface. In addition, the sphere information calculation unit 203 calculates a center position $(X_{c2}, Y_{c2}, Z_{c2})$ and a radius $R_2$ of a second spherical surface defined by the designated fifth to eighth points as a second parameter of the spherical surface. $X_{c1}$ and $X_{c2}$ indicate positions in the X2 direction. $Y_{c1}$ and $Y_{c2}$ indicate positions in the Y2 direction. $Z_{c1}$ and $Z_{c2}$ indicate positions in the Z2 direction.

The distortion amount calculation unit 204 calculates a distortion amount D of a spherical surface based on the parameters calculated by the sphere information calculation unit 203. The distortion amount D may be defined by deviation between the parameter of the first spherical surface and the parameter of the second spherical surface. In this example, the distortion amount D is defined by the following Formula (1).

$$D=(X_{c1}-X_{c2})^2+(Y_{c1}-Y_{c2})^2+(Z_{c1}-Z_{c2})^2+(R_1-R_2)^2 \qquad (1)$$

The correction value calculation unit 205 calculates first and second rotation angle correction values such that the distortion amount D calculated by the distortion amount calculation unit 204 is reduced. The first and second rotation angle correction values are rotation angles about the X2 axis and the Z2 axis, respectively, in the plurality of pieces of profile data constituting the three-dimensional data. The notification unit 206 causes the display unit 400 to display the first and second rotation angle correction values calculated by the correction value calculation unit 205. As a result, the user is notified of the first and second rotation angle correction values.

(4) Correction of Three-Dimensional Data and Luminance Image Data

As described above, the three-dimensional data representing the three-dimensional shape of the adjustment workpiece W is distorted when the imaging head 100 is attached in a misaligned state. FIGS. 15 and 16 are views illustrating three-dimensional data when the imaging head 100 is attached in the misaligned state. In FIGS. 15 and 16, each piece of profile data constituting the three-dimensional data is indicated by a dotted line. In addition, a region of the three-dimensional data that is a blind spot from the imaging head 100 is also illustrated for convenience in order to facilitate understanding.

In an example of FIG. 15, the Y1 direction of the imaging head 100 is misaligned about the X1 axis from the movement direction A of the adjustment workpiece W as illustrated in the upper part. In such a case, an outer edge of the adjustment workpiece W represented by the three-dimensional data is not circular but elliptical when viewed in the X2 direction as illustrated in the lower part. Similarly, in an example of FIG. 16, the Y1 direction of the imaging head 100 is misaligned about the Z1 axis from the movement direction A of the adjustment workpiece W as illustrated in the upper part. In such a case, an outer edge of the adjustment workpiece W represented by the three-dimensional data is not circular but elliptical when viewed in the Z2 direction as illustrated in the lower part.

A change in the profile data when the imaging head 100 is rotated about each axis is known, and a peak position of each of the pixel arrays SS of the profile data after the rotation can be calculated using a rotation matrix. Therefore, the shape generation unit 202 corrects the three-dimensional data so as to represent a three-dimensional shape of the adjustment workpiece W when the imaging head 100 is virtually rotated about the X2 axis and the Z2 axis based on the first and second rotation angle correction values calculated by the correction value calculation unit 205.

Specifically, the correction value calculation unit 205 changes the first and second rotation angle correction values each by a predetermined amount. The shape generation unit 202 rotates the peak position of each of the pixel arrays SS about the X2 axis by the first rotation angle correction value in each piece of the profile data constituting the three-dimensional data, and updates the profile data based on a plurality of peak positions after the rotation. Similarly, the shape generation unit 202 rotates the peak position of each of the pixel arrays SS about the Z2 axis by the second rotation angle correction value in each piece of the profile data constituting the three-dimensional data, and updates the profile data based on a plurality of peak positions after the rotation.

Figure 17:
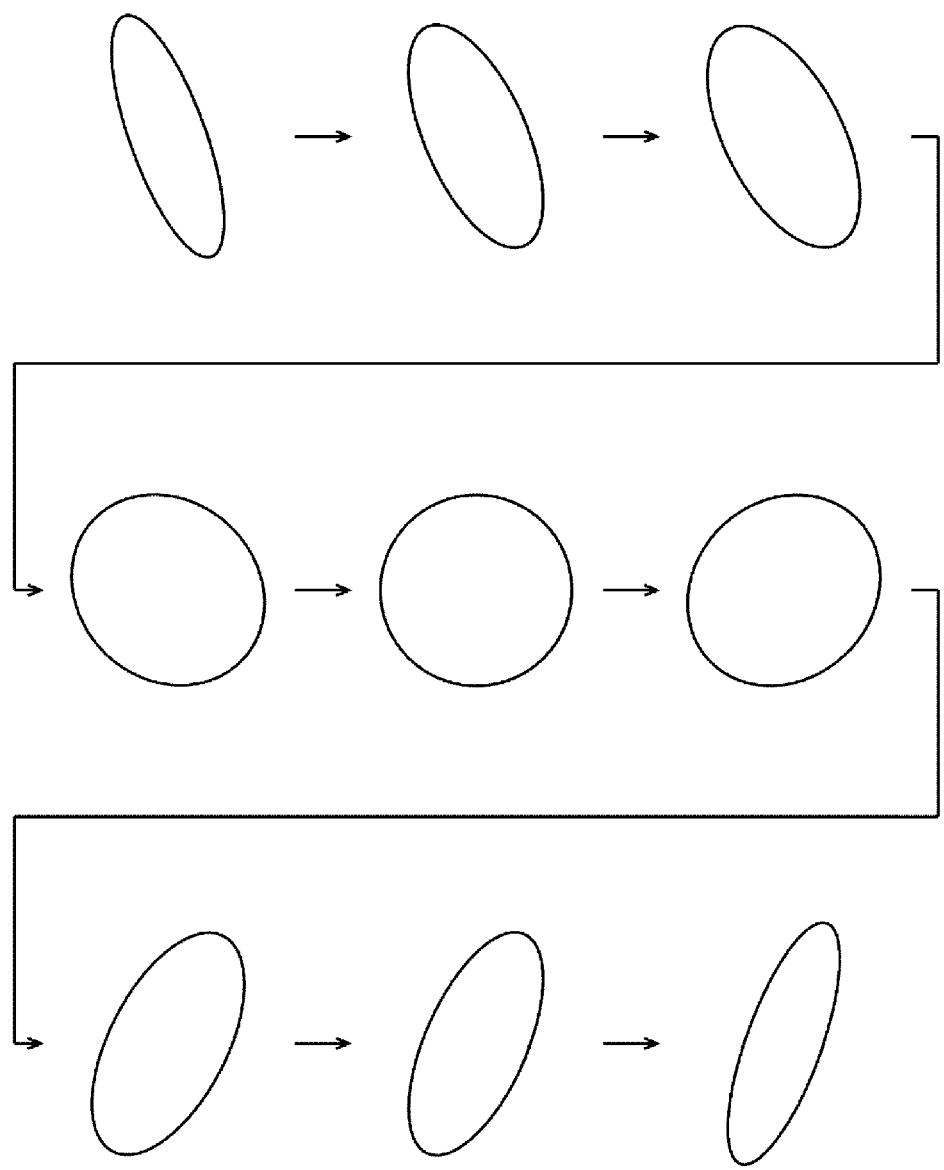
FIG. 17 is a view illustrating changes in corrected three-dimensional data.

The shape generation unit 202 arranges a plurality of pieces of the updated profile data in the Y2 direction. As a result, three-dimensional data corrected to rotate about the X2 axis and the Z2 axis is generated. FIG. 17 is a view illustrating changes in the corrected three-dimensional data. In the example of FIG. 17, an outer edge of the adjustment workpiece W represented by the three-dimensional data is changed by changing at least one of the first and second rotation angle correction values by a predetermined amount.

Every time the three-dimensional data is corrected, the sphere information calculation unit 203 corrects the first to fourth points and calculates parameters of a first spherical surface defined by the corrected first to fourth points again. Similarly, every time the three-dimensional data is corrected, the sphere information calculation unit 203 corrects the fifth to eighth points and calculates parameters of a second spherical surface defined by the corrected fifth to eighth points again. The distortion amount calculation unit 204 calculates the distortion amount D of the spherical surface again based on the parameters of the first and second spherical surfaces calculated again.

The sphere information calculation unit 203 and the distortion amount calculation unit 204 repeat the calculation of the parameter and the calculation of the distortion amount D until the distortion amount D is equal to or less than a predetermined threshold. The sphere information calculation unit 203 and the distortion amount calculation unit 204 may repeat the calculation of the parameter and the calculation of the distortion amount D until the distortion amount D becomes the minimum. Meanwhile, the correction value calculation unit 205 may specify an equation indicating the elliptical shape of the outer edge of the adjustment workpiece W, and analytically calculate the first and second rotation angle correction values when the distortion amount D is equal to or less than the threshold or becomes the minimum based on the specified equation. In such a case, the sphere information calculation unit 203 and the distortion amount calculation unit 204 do not necessarily repeat the calculation of the parameter and the calculation of the distortion amount D.

In addition, when the plurality of pieces of profile data constituting the three-dimensional data are updated, the shape generation unit 202 updates a plurality of peak luminance arrays so as to correspond to the plurality of pieces of profile data, respectively. In addition, the shape generation unit 202 arranges the plurality of updated peak luminance arrays in the Y2 direction. As a result, luminance image data corrected to rotate about the X2 axis and the Z2 axis is generated.

(5) Calibration Processing

Figure 18:
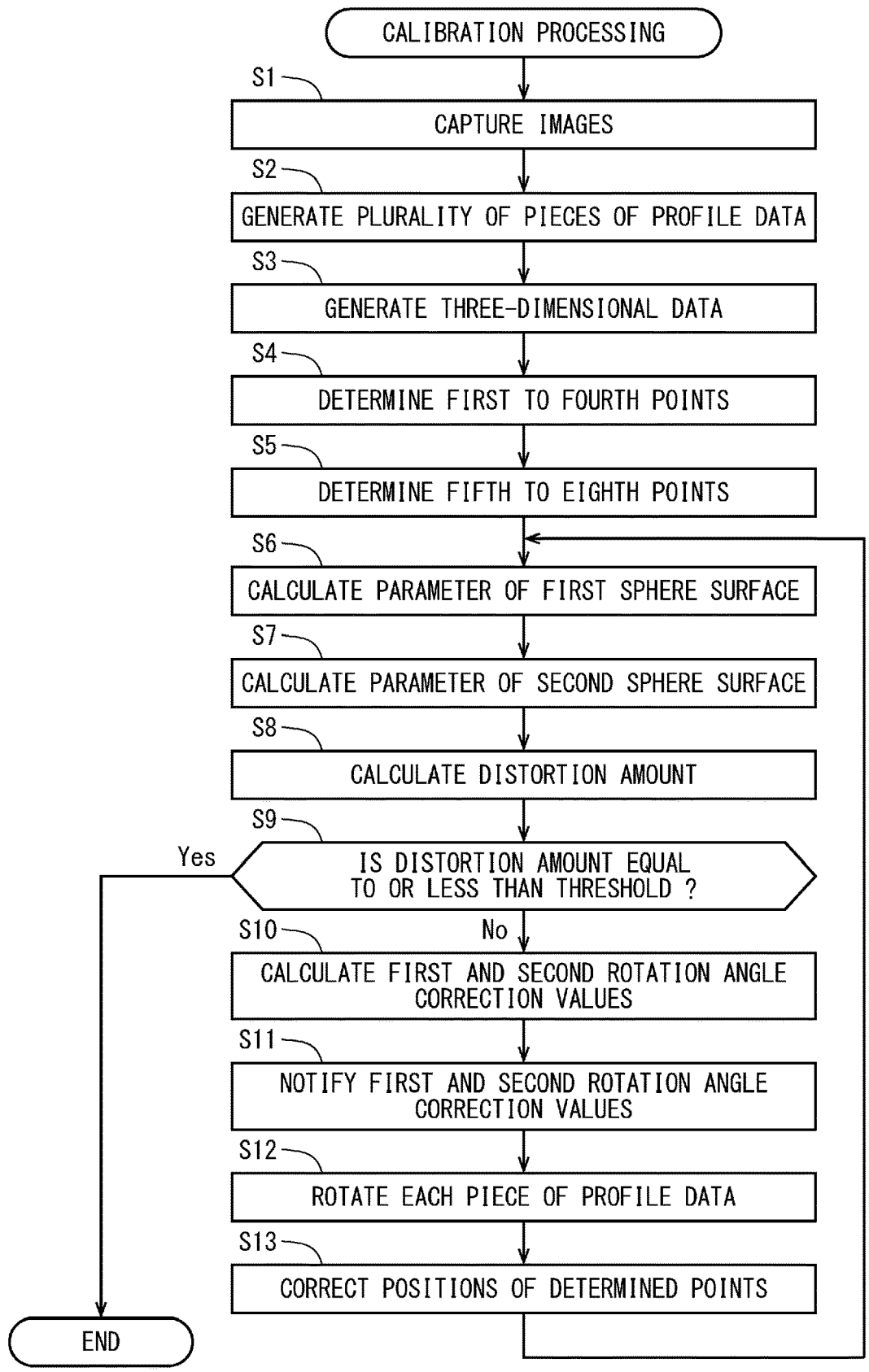
FIG. 18 is a flowchart illustrating calibration processing of the processing device in FIG. 14.

FIG. 18 is a flowchart illustrating calibration processing of the processing device 200 in FIG. 14. The calibration processing of FIG. 18 is performed as the control unit 220 of FIG. 1 executes the optical displacement measurement program stored in the storage unit 210. First, the profile generation unit 201 controls the imaging head 100 so as to periodically perform light projection by the light projecting unit 110 and light reception by the light receiving unit 121 to repeatedly capture images of the adjustment workpiece W (Step S1).

Next, the profile generation unit 201 generates a plurality of pieces of profile data based on light reception signals repeatedly output by the capturing in Step S1 (Step S2). At this time, the profile generation unit 201 may detect peak luminance arrays corresponding to the respective pieces of profile data from the light reception signals. Subsequently, the shape generation unit 202 generates three-dimensional data based on the plurality of pieces of profile data generated in Step S2 (Step S3). At this time, the shape generation unit 202 may generate luminance image data based on the peak luminance arrays detected by the profile generation unit 201.

Thereafter, the sphere information calculation unit 203 determines the first to fourth points in a portion corresponding to a spherical surface in the three-dimensional data generated in Step S3 (Step S4). Although the sphere information calculation unit 203 determines the first to fourth points based on designation received from the user in this example, the embodiment is not limited thereto. The sphere information calculation unit 203 may randomly determine the first to fourth points without receiving the designation from the user.

In addition, the sphere information calculation unit 203 determines the fifth to eighth points of a portion corresponding to the spherical surface in the three-dimensional data generated in Step S3 (Step S5). Although the sphere information calculation unit 203 determines the fifth to eighth points based on designation received from the user in this example, the embodiment is not limited thereto. The sphere information calculation unit 203 may randomly determine the fifth to eighth points without receiving the designation from the user.

Next, the sphere information calculation unit 203 calculates first parameters of the spherical surface defined by the first to fourth points determined in Step S4 (Step S6). In addition, the sphere information calculation unit 203 calculates second parameters of the spherical surface defined by the fifth to eighth points determined in Step S5 (Step S7). Subsequently, the distortion amount calculation unit 204 calculates the distortion amount D based on the first parameters of the spherical surface calculated in Steps S5 and S6, respectively (Step S8).

Subsequently, the correction value calculation unit 205 calculates whether the distortion amount D calculated in Step S8 is equal to or less than the threshold (Step S9). When the distortion amount D exceeds the threshold, the correction value calculation unit 205 calculates the first and second rotation angle correction values such that the distortion amount D is reduced (Step S10). The notification unit 206 notifies the first and second rotation angle correction values calculated in Step S10 (Step S11). Note that the processing device 200 does not necessarily include the notification unit 206. In such a case, Step S11 is omitted.

Thereafter, the shape generation unit 202 rotates the profile data about the X2 axis and the Z2 axis based on the first and second rotation angle correction values calculated in Step S10 (Step S12). As a result, the three-dimensional data is corrected. Here, when the luminance image data is generated in Step S3, the luminance image data is updated so as to correspond to the three-dimensional data. In addition, the sphere information calculation unit 203 corrects positions of the first to fourth points determined in Step S4 and the fifth to eighth points determined in Step S5 in the three-dimensional data corrected in Step S12 (Step S13), and returns to Step S6.

In Steps S6 and S7, parameters of first and second spherical surfaces defined by the points whose positions have been corrected in Step S13 are calculated again. Steps S6 to S13 are repeated until the distortion amount D is equal to or less than the threshold. In such a case, the first and second rotation angle correction values when the distortion amount D of the spherical surface is equal to or less than the threshold can be easily identified. When the distortion amount D is equal to or less than the threshold in Step S9, the calibration processing ends.

In the present embodiment, the first and second rotation angle correction values may be analytically calculated in Step S10 such that the distortion amount D is equal to or less than the threshold. In such a case, it is unnecessary to repeat Steps S10 to S13. Therefore, the calibration processing ends after Step S12 is executed.

In the present embodiment, the distortion amount D is calculated based on the deviation between the first parameter of the spherical surface defined by the first to fourth points and the second parameter of the spherical surface defined by the fifth to eighth points. Therefore, even when an actual dimension of the spherical surface of the adjustment workpiece W is unknown, the distortion amount D of the spherical surface can be easily calculated. However, the embodiment is not limited thereto. When the actual dimension of the spherical surface of the adjustment workpiece W is known, the distortion amount D may be calculated based on the deviation between the parameter of the first spherical surface defined by the first to fourth points and a parameter corresponding to the spherical surface of the adjustment workpiece W. In such a case, Steps S5 and S7 in the calibration processing are omitted.

(6) Effects

In the optical displacement measurement system 500 according to the present embodiment, the profile generation unit 201 generates the profile data of the adjustment workpiece W corresponding to each position in the Y1 direction in response to the relative movement of the adjustment workpiece W in the movement direction A. The shape generation unit 202 generates the three-dimensional data of the adjustment workpiece W based on the plurality of pieces of profile data. Here, even when the Y1 direction of the imaging head 100 is misaligned with respect to the movement direction A, the parameter of the spherical surface defined by the plurality of points included in the three-dimensional data generated by the shape generation unit 202 is calculated by the sphere information calculation unit 203.

The distortion amount calculation unit 204 calculates the distortion amount D of the spherical surface based on the parameter calculated by the sphere information calculation unit 203. The first and second rotation angle correction values in the plurality of pieces of profile data constituting the three-dimensional data are calculated by the correction value calculation unit 205 such that the distortion amount D calculated by the distortion amount calculation unit 204 is reduced. The shape generation unit 202 rotates the plurality of pieces of profile data constituting the three-dimensional data about the X2 axis and the Z2 axis based on the first and second rotation angle correction values calculated by the correction value calculation unit 205.

In such a case, it is possible to automatically generate the three-dimensional data representing the three-dimensional shape of the adjustment workpiece W when the distortion amount D of the spherical surface is small without adjusting attachment of the imaging head 100. As a result, the accurate shape of the adjustment workpiece W can be easily measured. In addition, it is possible to automatically generate the three-dimensional data representing the accurate three-dimensional shape of the measurement object S by correcting the three-dimensional data of the arbitrary measurement object S based on the first and second rotation angle correction values calculated using the adjustment workpiece W.

[2] Second Embodiment

Figure 19:
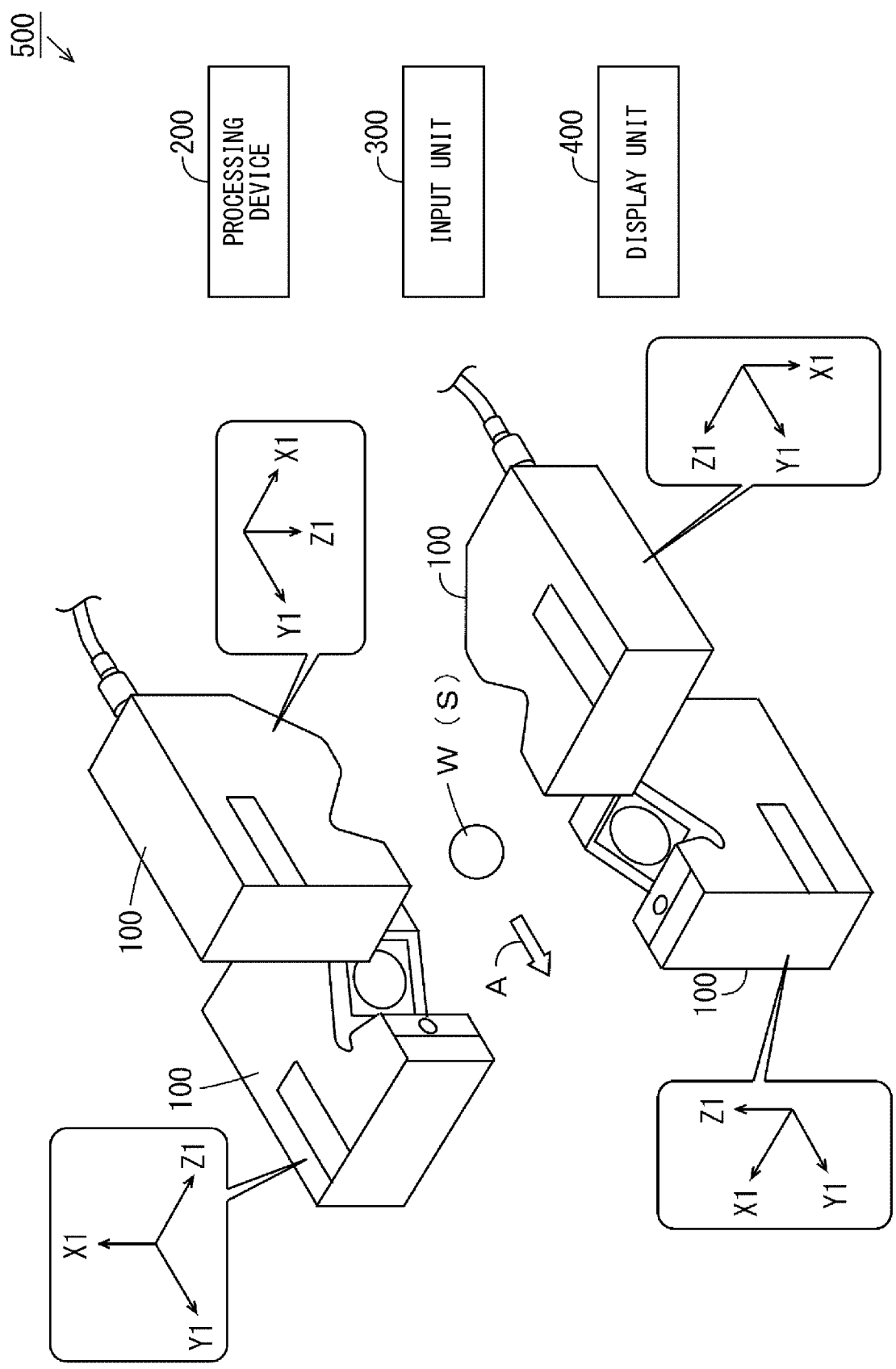
FIG. 19 is a schematic diagram illustrating a configuration of an optical displacement measurement system according to a second embodiment.

A difference between the optical displacement measurement system 500 according to a second embodiment and the optical displacement measurement system 500 according to the first embodiment will be described. FIG. 19 is a schematic diagram illustrating a configuration of the optical displacement measurement system 500 according to the second embodiment. As illustrated in FIG. 19, the optical displacement measurement system 500 includes a plurality of the imaging heads 100 disposed so as to surround the measurement object S (adjustment workpiece W). In the present embodiment, the optical displacement measurement system 500 includes four imaging heads 100, but may include two or three imaging heads 100, or may include five or more imaging heads 100.

An X1 direction, a Y1 direction, and a Z1 direction unique to each of the imaging heads 100 are defined in advance. In FIG. 19, the X1 direction, the Y1 direction, and the Z1 direction defined for each of the imaging heads 100 are illustrated so as to correspond to the relevant imaging head 100 by a balloon. Each of the imaging heads 100 is attached such that the Y1 direction is substantially parallel to the movement direction A of the measurement object S.

The processing device 200 includes the profile generation unit 201, the shape generation unit 202, the sphere information calculation unit 203, the distortion amount calculation unit 204, the correction value calculation unit 205, and the notification unit 206 in FIG. 14. The processing device 200 does not necessarily include the notification unit 206. The processing device 200 executes the calibration processing in the first embodiment for each of the imaging heads 100. Hereinafter, an operation of the processing device 200 after execution of the calibration processing in the first embodiment will be described.

The sphere information calculation unit 203 calculates a reference point related to a spherical surface of the adjustment workpiece W based on corresponding three-dimensional data for each of the imaging heads 100. The reference point may be an arbitrary point on the spherical surface, or may be the center of the spherical surface. When the adjustment workpiece W has a characteristic point such as an unevenness on the spherical surface, the reference point may be the characteristic point. The correction value calculation unit 205 calculates first, second, and third translation amount correction values in a plurality of pieces of profile data constituting each piece of the three-dimensional data so as to reduce deviation between the reference point calculated by the sphere information calculation unit 203 for the plurality of imaging heads 100. The first to third translation amount correction values are translation amounts parallel to an X2 direction, a Z2 direction, and a Y2 direction in the three-dimensional data, respectively.

For example, it is assumed that a reference point calculated by the first imaging head 100 is at coordinates (0.1, 0, 0) determined in advance by the optical displacement measurement system 500. In addition, it is assumed that a reference point calculated by the second imaging head 100 is at coordinates (0, 0.1, 0), a reference point calculated by the third imaging head 100 is at coordinates (0, 0, 0.1), and a reference point calculated by the fourth imaging head 100 is at coordinates (0.1, 0, 0.1). The first to third translation amount correction values corresponding to each of the imaging heads 100 may be calculated such that the coordinates of these reference points are located at specific coordinates (for example, coordinates (0, 0, 0) of the origin).

The shape generation unit 202 corrects the three-dimensional data so as to represent the adjustment workpiece W when each of the imaging heads 100 is virtually translated in the X1 direction, the Z1 direction, and the Y1 direction based on the first to third translation amount correction values calculated by the correction value calculation unit 205.

Specifically, a peak position of each of the pixel arrays SS in each piece of the profile data constituting the three-dimensional data is translated in the X2 direction, the Z2 direction, and the Y2 direction by the first to third translation amount correction values, respectively. The respective pieces of profile data are updated based on the plurality of peak positions after the translation. The plurality of pieces of updated profile data are arranged in the Y2 direction, thereby generating three-dimensional data corrected to translate in the X2 direction, the Z2 direction, and the Y2 direction. In addition, when the three-dimensional data has been corrected, the luminance image data is updated so as to correspond to the three-dimensional data.

Although the correction value calculation unit 205 calculates the first to third translation amount correction values corresponding to all the imaging heads 100 in the above description, the embodiment is not limited thereto. The correction value calculation unit 205 may calculate the first to third translation amount correction values corresponding to the imaging heads 100 other than any one of the imaging heads 100 (hereinafter, referred to as a reference imaging head). In such a case, the shape generation unit 202 corrects the three-dimensional data corresponding to the imaging heads 100 other than the reference imaging head based on the first to third translation amount correction values calculated by the correction value calculation unit 205.

Figure 20:
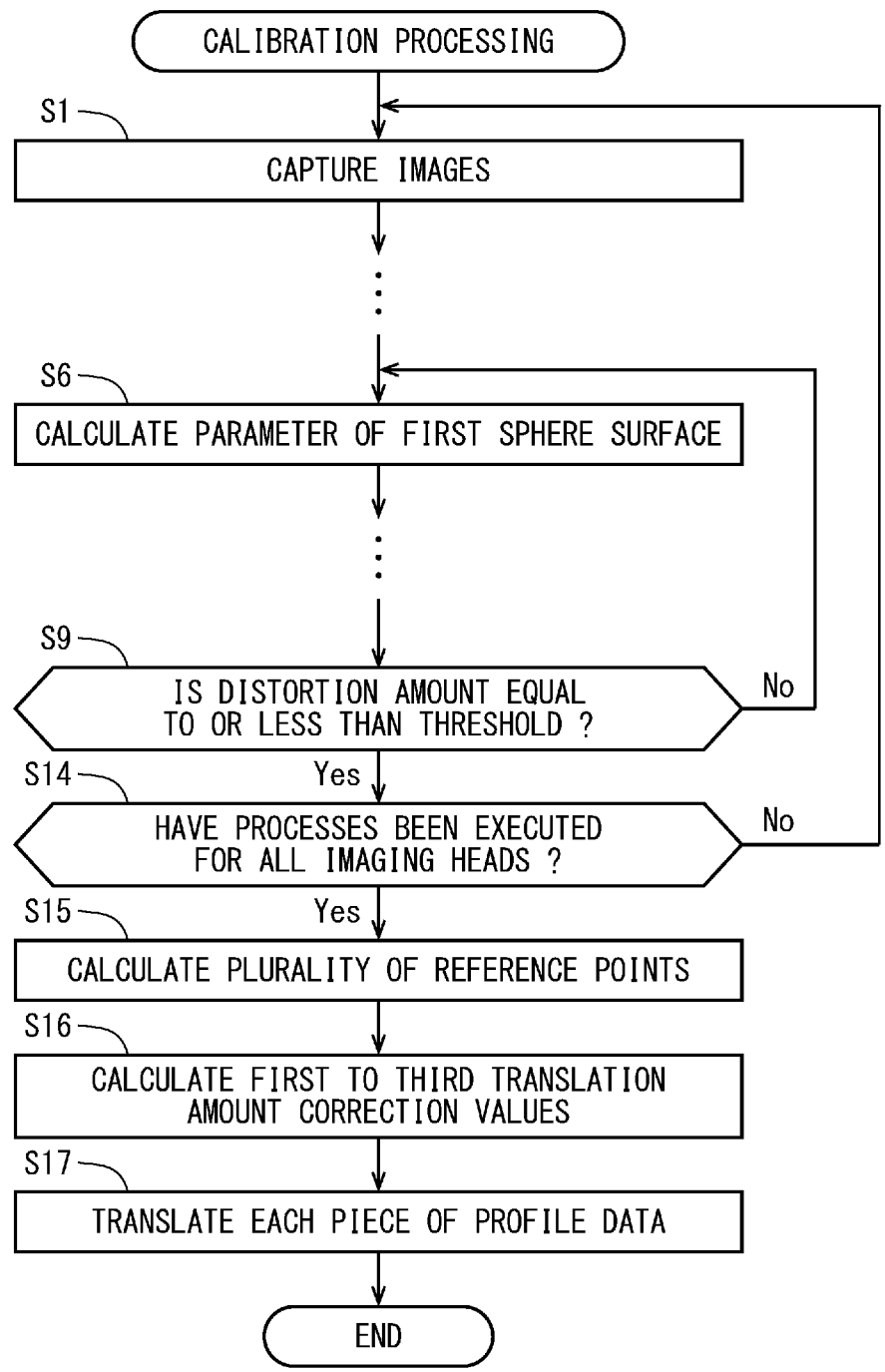
FIG. 20 is a flowchart illustrating calibration processing of a processing device in FIG. 19.

FIG. 20 is a flowchart illustrating the calibration processing of the processing device 200 in FIG. 19. First, the processing device 200 executes Steps S1 to S13, similar to Steps S1 to S13 of the calibration processing in the first embodiment of FIG. 18, for each of the imaging heads 100. Specifically, after processes in Steps S1 to S13 are completed for one imaging head 100, that is, after it is determined in Step S9 that the distortion amount D is equal to or less than a threshold, the sphere information calculation unit 203 determines whether the processes in Steps S1 to S13 have been completed for all the imaging heads 100 (Step S14).

When the processes have not been executed for all the imaging heads 100, the sphere information calculation unit 203 returns to Step S1. As a result, the processes in Steps S1 to S13 are executed on the other imaging heads 100. Steps S1 to S14 are repeated until the processes in Steps S1 to S13 are executed for all the imaging heads 100. When the processes in Steps S1 to S13 have been executed for all the imaging heads 100, the sphere information calculation unit 203 calculates a plurality of reference points of the adjustment workpiece W corresponding to the plurality of imaging heads 100 (Step S15).

Next, the correction value calculation unit 205 calculates first to third translation amount correction values in a plurality of pieces of profile data constituting each piece of three-dimensional data so as to reduce deviation of the plurality of reference points calculated in Step S15 (Step S16). The notification unit 206 may cause the display unit 400 to display the first to third translation amount correction values calculated in Step S16 to notify the user of the first to third translation amount correction values.

Thereafter, the shape generation unit 202 translates each piece of the profile data constituting the three-dimensional data corresponding to each of the imaging heads 100 in the X2 direction, the Z2 direction, and the Y2 direction based on the first to third translation amount correction values calculated in Step S16 (Step S17). As a result, each piece of the three-dimensional data is corrected. Here, when the luminance image data is generated in Step S3, the luminance image data is updated so as to correspond to the three-dimensional data. After the three-dimensional data is corrected, the calibration processing in the present embodiment ends.

In the optical displacement measurement system 500 according to the present embodiment, the correction value calculation unit 205 calculates the first to third translation amount correction values so as to reduce the deviation of the reference point related to the spherical surface even when the plurality of pieces of three-dimensional data corresponding to the plurality of imaging heads 100 are misaligned in the X2 direction, the Z2 direction, or the Y2 direction. In addition, the shape generation unit 202 translates the plurality of pieces of profile data constituting the three-dimensional data in the X2 direction, the Z2 direction, and the Y2 direction based on the first to third translation amount correction values.

In this case, it is possible to automatically generate the plurality of pieces of three-dimensional data representing a three-dimensional shape of the adjustment workpiece W when the deviation of the reference point of the spherical surface is small without adjusting attachment of the imaging heads 100 In addition, it is possible to automatically generate the plurality of pieces of three-dimensional data representing the three-dimensional shape of the measurement object S by correcting the three-dimensional data of the arbitrary measurement object S based on the first to third translation amount correction values calculated using the adjustment workpiece W.

[3] Third Embodiment

Figure 21:
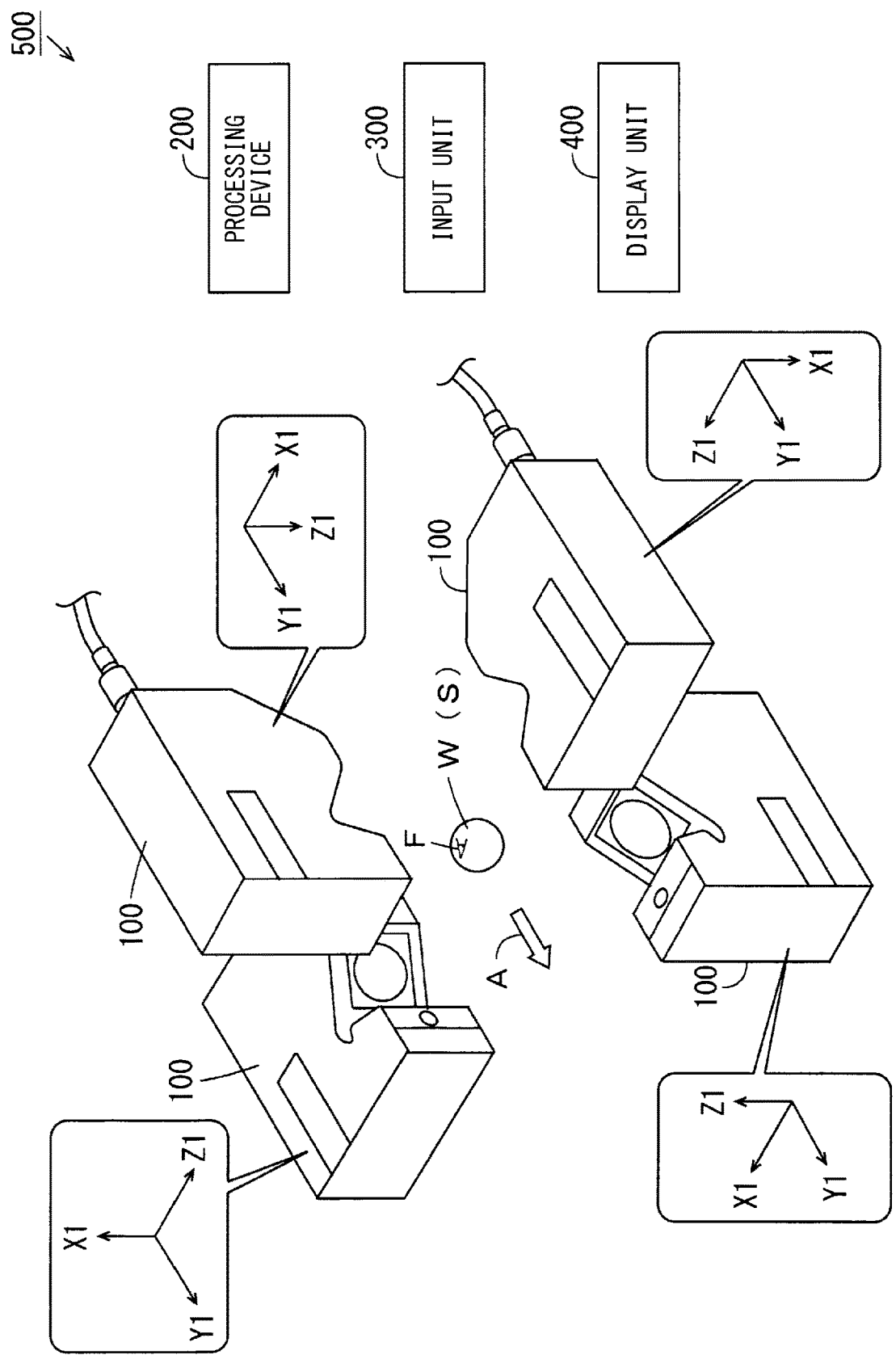
FIG. 21 is a schematic diagram illustrating a configuration of an optical displacement measurement system according to a third embodiment.

A difference between the optical displacement measurement system 500 according to a third embodiment and the optical displacement measurement system 500 according to the second embodiment will be described. FIG. 21 is a schematic diagram illustrating a configuration of the optical displacement measurement system 500 according to the third embodiment. As illustrated in FIG. 21, a spherical surface of the adjustment workpiece W has a characteristic portion F in the present embodiment. In the present example, the characteristic portion F is a printing on the surface of the spherical surface, but may be a pattern attached to the surface of the spherical surface, or may be an unevenness, a groove, or the like formed on the surface of the spherical surface.

Figure 22:
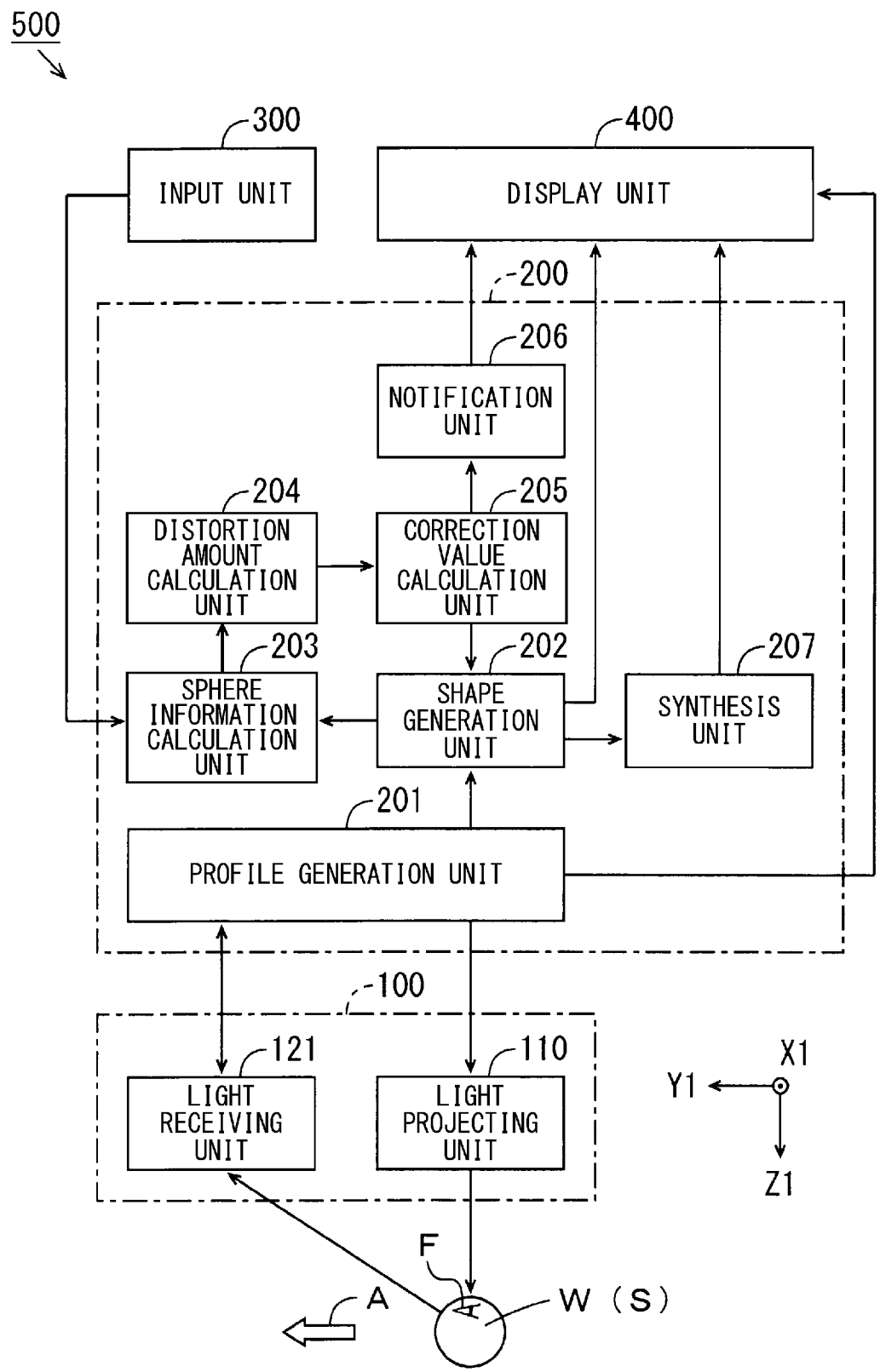
FIG. 22 is a block diagram illustrating a configuration of a processing device in FIG. 21.

FIG. 22 is a block diagram illustrating a configuration of the processing device 200 in FIG. 21. As illustrated in FIG. 22, the processing device 200 further includes a synthesis unit (synthesizer) 207 as a functional unit in addition to the profile generation unit 201, the shape generation unit 202, the sphere information calculation unit 203, the distortion amount calculation unit 204, the correction value calculation unit 205, and the notification unit 206 in FIG. 14. The processing device 200 does not necessarily include the notification unit 206. The processing device 200 executes the calibration processing in the second embodiment. Hereinafter, an operation of the processing device 200 after execution of the calibration processing in the second embodiment will be described.

The shape generation unit 202 identifies the characteristic portion F in three-dimensional data corresponding to each of the imaging heads 100. Here, in a case where the characteristic portion F is a printing or a pattern attached to the surface of the spherical surface, the characteristic portion F is identified based on the three-dimensional data and luminance image data corresponding to each other. On the other hand, in a case where the characteristic portion F is an unevenness, a groove, or the like formed on the surface of the spherical surface, the characteristic portion F can be identified based on only the three-dimensional data.

The correction value calculation unit 205 calculates third rotation angle correction values such that the characteristic portions F of the plurality of pieces of three-dimensional data identified by the shape generation unit 202 match. The third rotation angle correction value is a rotation angle about the Y2 axis in a plurality of pieces of profile data constituting the three-dimensional data. In the case where the characteristic portion F is the printing, the pattern, or the like, a matching degree of the characteristic portions F of the plurality of pieces of three-dimensional data can be determined by, for example, pattern matching of the three-dimensional data and the luminance image data. On the other hand, in the case where the characteristic portion F is the unevenness, the groove, or the like, a matching degree of the characteristic portions F of the plurality of pieces of three-dimensional data can be determined by, for example, pattern matching of the three-dimensional data. The shape generation unit 202 corrects the three-dimensional data so as to represent the adjustment workpiece W when the imaging head 100 is virtually rotated about the Y2 axis based on the third rotation angle correction value calculated by the correction value calculation unit 205.

Specifically, a peak position of each of the pixel arrays SS in each piece of the profile data constituting the three-dimensional data is rotated about the Y2 axis by the third rotation angle correction value. The respective pieces of profile data are updated based on the plurality of peak positions after the rotation. The plurality of pieces of updated profile data are arranged in the Y2 direction, thereby generating three-dimensional data corrected to rotate about the Y2 axis. After the plurality of pieces of three-dimensional data corresponding to the plurality of imaging heads 100 are corrected, the synthesis unit 207 synthesizes the plurality of pieces of three-dimensional data to generate synthesized data representing a three-dimensional shape of the adjustment workpiece W.

Although the correction value calculation unit 205 calculates the third rotation angle correction values corresponding to all the imaging heads 100 such that the characteristic portions F of the spherical surfaces corresponding to the imaging heads 100 match in the above description, the embodiment is not limited thereto. The correction value calculation unit 205 may calculate third rotation angle correction values corresponding to the imaging heads 100 other than a reference imaging head. In such a case, the shape generation unit 202 corrects the three-dimensional data corresponding to the imaging heads 100 other than the reference imaging head based on the third rotation angle correction values calculated by the correction value calculation unit 205.

Figure 23:
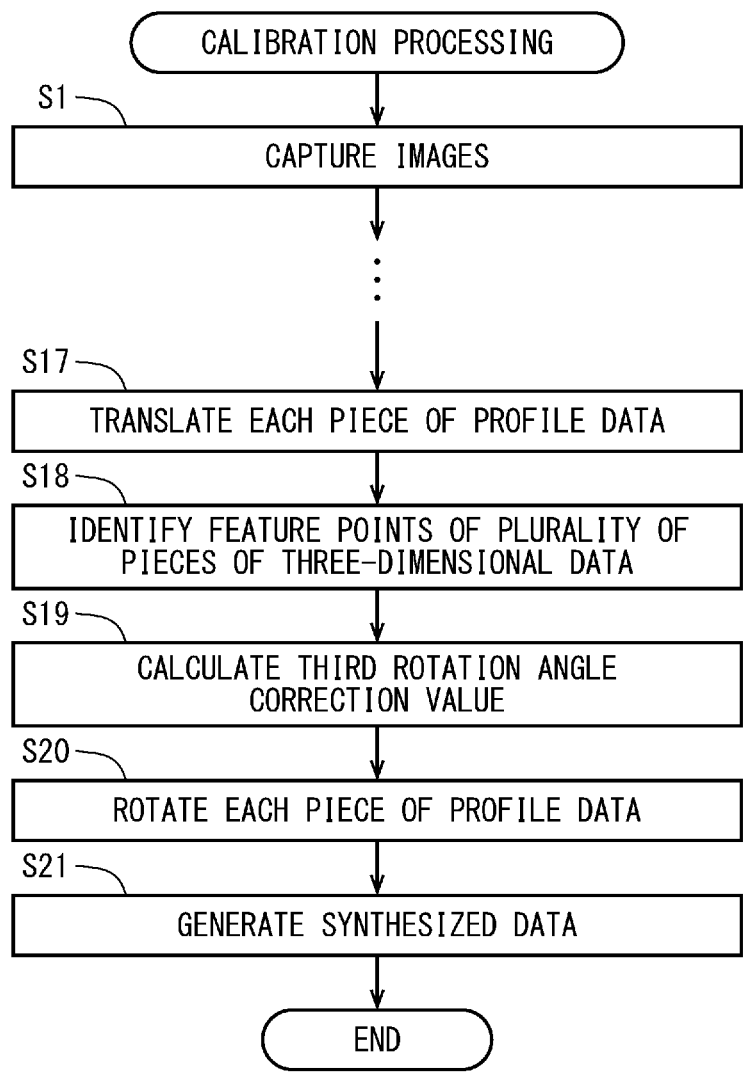
FIG. 23 is a flowchart illustrating calibration processing of the processing device in FIG. 22.

FIG. 23 is a flowchart illustrating the calibration processing of the processing device 200 in FIG. 22. First, the processing device 200 executes Steps S1 to S17 similar to Steps S1 to S17 of the calibration processing in the second embodiment of FIG. 20. After completion of Steps S1 to S17, the shape generation unit 202 identifies the characteristic portions F of a plurality of pieces of three-dimensional data corresponding to the plurality of imaging heads 100 (Step S18).

Next, the correction value calculation unit 205 calculates third rotation angle correction values such that the characteristic portions F of the plurality of pieces of three-dimensional data identified in Step S18 match (Step S19). Since the characteristic portion F is a character in this example, a matching degree of the characteristic portions F of pieces of the three-dimensional data is determined by pattern matching of the three-dimensional data and the luminance image data. The notification unit 206 may cause the display unit 400 to display the third rotation angle correction values calculated in Step S19 to notify the user of the third rotation angle correction values.

Thereafter, the shape generation unit 202 rotates each piece of profile data constituting the three-dimensional data corresponding to each of the imaging heads 100 about the Y2 axis based on the third rotation angle correction value calculated in Step S19 (Step S20). As a result, each piece of the three-dimensional data is corrected. Here, the luminance image data is updated so as to correspond to the three-dimensional data. Finally, the synthesis unit 207 synthesizes the plurality of pieces of three-dimensional data corrected in Step S20 to generate synthesized data (Step S21). As a result, the calibration processing in the present embodiment ends.

In the optical displacement measurement system 500 according to the present embodiment, the correction value calculation unit 205 calculates the third rotation angle correction values such that the characteristic portions F in the plurality of pieces of three-dimensional data match even when the plurality of pieces of three-dimensional data corresponding to the plurality of imaging heads 100 are misaligned about the Y2 axis. In addition, the shape generation unit 202 rotates the plurality of pieces of profile data constituting the three-dimensional data about the Y2 axis based on the third rotation angle correction values.

In such a case, it is possible to automatically generate the plurality of pieces of three-dimensional data representing the three-dimensional shape of the adjustment workpiece W when the characteristic portions F match without adjusting attachment of the imaging heads 100. In addition, it is possible to synthesize the plurality of pieces of three-dimensional data since the rotational misalignment about each of the X2 axis, the Z2 axis, and the Y2 axis is reduced in the plurality of pieces of three-dimensional data, and the translational misalignment in each of the X2 direction, the Z2 direction, and the Y2 direction is reduced. Therefore, the synthesized data indicating a more accurate three-dimensional shape of the adjustment workpiece W can be easily generated by synthesizing the plurality of pieces of three-dimensional data.

Although the processing device 200 includes the synthesis unit 207 in the present embodiment, the embodiment is not limited thereto. In a case where it is unnecessary to synthesize a plurality of pieces of three-dimensional data, the processing device 200 does not necessarily include the synthesis unit 207. In this case, Step S21 in the calibration processing is omitted.

[4] Other Embodiments (1) Although the processing device 200 is provided as a part of the optical displacement measurement system 500 in the above embodiments, the embodiment is not limited thereto. The processing device 200 is not necessarily provided as a part of the optical displacement measurement system 500 as long as the processing device 200 is used for an optical displacement meter of an optical cutting method including a light projecting unit and a light receiving unit.

(2) Although the three-dimensional data is corrected to rotate about the X2 axis and the Z2 axis based on the first and second rotation angle correction values in the first embodiment, the embodiment is not limited thereto. In a case where the processing device 200 includes the notification unit 206, the user can easily perform accurate attachment adjustment of the imaging head 100 such that the distortion amount D of the spherical surface decreases by using the first and second rotation angle correction values notified by the notification unit 206. As a result, the accurate shape of the adjustment workpiece W can be easily measured. Therefore, the three-dimensional data is not necessarily corrected to rotate about the X2 axis and the Z2 axis based on the first and second rotation angle correction values.

(3) Although the correction value calculation unit 205 calculates both the first rotation angle correction value and the second rotation angle correction value in the first embodiment, the embodiment is not limited thereto. For example, in a case where the imaging head 100 is attached such that there is no misalignment of a rotation angle about the X1 axis, the correction value calculation unit 205 may calculate only the second rotation angle correction value. In this case, the shape generation unit 202 may correct three-dimensional data by rotating a plurality of pieces of profile data constituting the three-dimensional data about the Z2 axis based on the calculated second rotation angle correction value. In addition, the notification unit 206 may notify only the calculated second rotation angle correction value.

Similarly, in a case where the imaging head 100 is attached such that there is no misalignment of a rotation angle about the Z1 axis, the correction value calculation unit 205 may calculate only the first rotation angle correction value. In this case, the shape generation unit 202 may correct three-dimensional data by rotating a plurality of pieces of profile data constituting the three-dimensional data about the X2 axis based on the calculated first rotation angle correction value. In addition, the notification unit 206 may notify only the calculated first rotation angle correction value.

(4) Although the three-dimensional data is corrected so as to translate in the X2 direction, the Z2 direction, and the Y2 direction based on the first to third translation amount correction values in the second embodiment, the embodiment is not limited thereto. In a case where the processing device 200 includes the notification unit 206, the user can easily perform accurate attachment adjustment of each of the imaging heads 100 such that the deviation of the reference point of the spherical surface decreases by using the first to third translation amount correction values notified by the notification unit 206. Therefore, the three-dimensional data is not necessarily corrected so as to translate in the X2 direction, the Z2 direction, and the Y2 direction based on the first to third translation amount correction values.

(5) Although the correction value calculation unit 205 calculates the first translation amount correction value, the second translation amount correction value, and the third translation amount correction value in the second embodiment, the embodiment is not limited thereto. In a case where the imaging head 100 is attached such that there is no misalignment in any of the X1 direction, the Y1 direction, and the Z1 direction, the correction value calculation unit 205 may calculate a translation amount correction value corresponding to at least one direction in which misalignment may occur among the first translation amount correction value, the second translation amount correction value, and the third translation amount correction value.

In such a case, the shape generation unit 202 may correct three-dimensional data by translating a plurality of pieces of profile data constituting the three-dimensional data in a direction corresponding to the translation amount correction value based on the calculated translation amount correction value. In addition, the notification unit 206 may notify only the calculated translation amount correction value.

(6) Although the three-dimensional data is corrected so as to rotate about the Y2 axis based on the third rotation angle correction value in the third embodiment, the embodiment is not limited thereto. In a case where the processing device 200 includes the notification unit 206, the user can easily perform accurate attachment adjustment of each of the imaging heads 100 such that the characteristic portions F match using the third rotation angle correction value notified by the notification unit 206. Therefore, the three-dimensional data is not necessarily corrected to rotate about the Y2 axis based on the third rotation angle correction value.

[5] Correspondence Relationship Between Each Component of Claims and Each Element of Embodiments Hereinafter, an example of the correspondence between each component of the claims and each element of the embodiments will be described, but the present invention is not limited to the following example. Various other elements having the configurations or functions described in the claims can be used as each component of the claims.

The optical displacement measurement system 500 is an example of an optical displacement measurement system, the X1 direction or the X2 direction is an example of a first direction, the Z1 direction or the Z2 direction is an example of a second direction, and the Y1 direction or the Y2 direction is an example of a third direction. The light projecting unit 110 is an example of a light projecting unit, the adjustment workpiece W is an example of a workpiece, and the light receiving unit 121 is an example of a light receiving unit.

The profile generation unit 201 is an example of a profile generation unit, the shape generation unit 202 is an example of a shape generation unit, the sphere information calculation unit 203 is an example of a sphere information calculation unit, and the distortion amount calculation unit 204 is an example of a distortion amount calculation unit. The correction value calculation unit 205 is an example of a correction value calculation unit, the characteristic portion F is an example of a characteristic portion, the synthesis unit 207 is an example of a synthesis unit, the notification unit 206 is an example of a notification unit, and the processing device 200 is an example of a processing device.

What is claimed is:

1. An optical displacement measurement system using an optical cutting method comprising:
a light projector in which a first direction, a second direction, and a third direction intersecting with each other are defined in advance and which emits, in the second direction, slit light spreading in the first direction or spot light scanning in the first direction;
a light receiver which includes a plurality of pixels arranged two-dimensionally, receives light reflected at each position in the first direction of a workpiece having a spherical surface, and outputs a light reception signal indicating a light receiving amount; and
a processing device comprising a profile generation unit, a shape generation unit, a sphere information calculation unit, a distortion amount calculation unit, and a correction value calculation unit, wherein the profile generation unit generates profile data representing a profile of the workpiece having the spherical surface in a plane defined by the first direction and the second direction based on the light reception signal;
the shape generation unit synthesizes a plurality of profiles generated for each position in the third direction by relatively moving the workpiece having the spherical surface to the light projector and the light receiver in a direction corresponding to the third direction, and generates three-dimensional data representing a three-dimensional shape of the workpiece having the spherical surface;
the sphere information calculation unit calculates a parameter of the spherical surface defined by a plurality of points included in the three-dimensional data;
the distortion amount calculation unit calculates a distortion amount of the spherical surface based on the parameter; and
the correction value calculation unit calculates at least one of a first rotation angle correction value around a first axis parallel to the first direction and a second rotation angle correction value around a second axis parallel to the second direction in the plurality of pieces of profile data constituting the three-dimensional data so as to reduce the distortion amount.

2. The optical displacement measurement system according to claim 1, wherein
the sphere information calculation unit calculates a first parameter of the spherical surface defined by a first point, a second point, a third point, and a fourth point included in the three-dimensional data and calculates a second parameter of the spherical surface defined by a fifth point, a sixth point, a seventh point, and an eighth point included in the three-dimensional data, and
the distortion amount calculation unit calculates the distortion amount based on deviation between the first parameter of the spherical surface and the second parameter of the spherical surface.

3. The optical displacement measurement system according to claim 1, wherein
the shape generation unit corrects the three-dimensional data by rotating the plurality of pieces of profile data constituting the three-dimensional data around the first axis based on the first rotation angle correction value or around the second axis based on the second rotation angle correction value or any combination thereof.

4. The optical displacement measurement system according to claim 3, wherein
the correction value calculation unit changes the first rotation angle correction value and the second rotation angle correction value each by a predetermined amount, and
the sphere information calculation unit and the distortion amount calculation unit repeat the calculation of the parameter and the calculation of the distortion amount, respectively, until the distortion amount is equal to or less than a predetermined threshold.

5. The optical displacement measurement system according to claim 3, wherein
a plurality of sets of the light projector and the light receiver are provided so as to correspond to each other, the shape generation unit operates to rotate the plurality of pieces of profile data constituting a plurality of pieces of the three-dimensional data, which correspond to the sets of the light projector and the light receiver, around the first axis and the second axis based on the first rotation angle correction value and the second rotation angle correction value calculated for each of the sets of the light projector and the light receiver, the sphere information calculation unit calculates a reference point related to the spherical surface based on the plurality of pieces of three-dimensional data for each of the sets of the light projector and the light receiver after the plurality of pieces of profile data are rotated, and the correction value calculation unit calculates a first translation amount correction value parallel to the first direction, a second translation amount correction value parallel to the second direction, and a third translation amount correction value parallel to the third direction in the plurality of pieces of profile data constituting at least one piece of the three-dimensional data so as to reduce deviation between the reference point calculated for each of the sets of the light projector and the light receiver.

6. The optical displacement measurement system according to claim 5, wherein
the shape generation unit corrects the three-dimensional data by translating the plurality of pieces of profile data constituting the at least one piece of three-dimensional data in the first direction, the second direction, and the third direction based on the first translation amount correction value, the second translation amount correction value, and the third translation amount correction value.

7. The optical displacement measurement system according to claim 6, wherein
the spherical surface has a characteristic portion, and
the correction value calculation unit calculates a third rotation angle correction value around a third axis parallel to the third direction in the plurality of pieces of profile data constituting the at least one piece of three-dimensional data such that the characteristic portions included in the plurality of pieces of the three-dimensional data match after the plurality of pieces of profile data constituting the at least one piece of three-dimensional data are translated in the first direction, the second direction, and the third direction.

8. The optical displacement measurement system according to claim 7, wherein
the shape generation unit corrects the three-dimensional data by rotating the plurality of pieces of profile data constituting the at least one piece of three-dimensional data about the third axis based on the third rotation angle correction value.

9. The optical displacement measurement system according to claim 8, wherein the processing device further comprises
a synthesis unit which synthesizes the plurality of pieces of three-dimensional data after the plurality of pieces of profile data constituting the at least one piece of three-dimensional data are rotated about the third axis to generate synthesized data representing a three-dimensional shape of the workpiece having the spherical surface.

10. The optical displacement measurement system according to claim 1, wherein the processing device further comprises a notification unit which notifies at least one of the first rotation angle correction value and the second rotation angle correction value.

11. A processing device used for an optical displacement meter using an optical cutting method that includes: a light projector in which a first direction, a second direction, and a third direction intersecting with each other are defined in advance and which emits, in the second direction, slit light spreading in the first direction or spot light scanning in the first direction; and a light receiver which includes a plurality of pixels arranged two-dimensionally, receives reflected light from each position in the first direction of a workpiece having a spherical surface, and outputs a light reception signal indicating a light receiving amount, the processing device comprising:

a profile generation unit which generates profile data representing a profile of the workpiece having the spherical surface in a plane defined by the first direction and the second direction based on the light reception signal;

a shape generation unit which synthesizes a plurality of profile data generated for each position in the third direction by relatively moving the workpiece having the spherical surface to the light projector and the light receiver in a direction corresponding to the third direction, and generates three-dimensional data representing a three-dimensional shape of the workpiece having the spherical surface;

a sphere information calculation unit which calculates a parameter of a spherical surface defined by a plurality of points included in the three-dimensional data;

a distortion amount calculation unit which calculates a distortion amount of the spherical surface based on the parameter; and a correction value calculation unit which calculates at least one of a first rotation angle correction value around a first axis parallel to the first direction and a second rotation angle correction value around a second axis parallel to the second direction in the plurality of pieces of profile data constituting the three-dimensional data so as to reduce the distortion amount.

12. An optical displacement meter using an optical cutting method that includes: a light projector in which a first direction, a second direction, and a third direction intersecting with each other are defined in advance and which emits, in the second direction, slit light spreading in the first direction or spot light scanning in the first direction, and a light receiver which includes a plurality of pixels arranged two-dimensionally, receives reflected light from each position in the first direction of a workpiece having a spherical surface, and outputs a light reception signal indicating a light receiving amount, the optical displacement meter comprising a processor in communication with a memory, the processor being configured to execute instructions stored in the memory that cause the processor to:

generate profile data representing a profile of the workpiece having the spherical surface in a plane defined by the first direction and the second direction based on the light reception signal;

synthesize a plurality of profile data generated for each position in the third direction by relatively moving the workpiece having the spherical surface to the light projector and the light receiver in a direction corresponding to the third direction, and generate three-dimensional data representing a three-dimensional shape of the workpiece having the spherical surface;

calculate a parameter of a spherical surface defined by a plurality of points included in the three-dimensional data;

calculate a distortion amount of the spherical surface based on the parameter; and calculate at least one of a first rotation angle correction value around a first axis parallel to the first direction and a second rotation angle correction value around a second axis parallel to the second direction in the plurality of pieces of profile data constituting the three-dimensional data so as to reduce the distortion amount.

\* \* \* \* \*